United States Patent
Lin et al.

(12) 
(10) Patent No.: US 6,416,802 B1
(45) Date of Patent: Jul. 9, 2002

(54) METHOD OF MAKING QUICK COOKING AND INSTANT RICE

(75) Inventors: Yah Hwa E. Lin, Houston, TX (US); Luc Jacops, Bouwel (BE)

(73) Assignee: Uncle Ben's, Inc., Vernon, CA (US)

( * ) Notice: Subject to any disclaimer, the term of this patent is extended or adjusted under 35 U.S.C. 154(b) by 0 days.

(21) Appl. No.: 09/322,657

(22) Filed: May 28, 1999

Related U.S. Application Data

(62) Division of application No. 08/671,363, filed on Jun. 27, 1996, now abandoned.

(51) Int. Cl.[7] ............................................. A23L 1/182
(52) U.S. Cl. .................. 426/238; 426/462; 426/464; 426/481; 426/618; 426/627
(58) Field of Search .......................... 426/627, 443, 426/449, 457, 481, 482, 618, 238, 462, 464

(56) References Cited

U.S. PATENT DOCUMENTS

| | | |
|---|---|---|
| 2,438,939 A | 4/1948 | Ozai-Durrani |
| 2,733,147 A | 1/1956 | Ozai-Durrani |
| 2,740,719 A | 4/1956 | Ozai-Durrani |
| 3,870,804 A | 3/1975 | Tolson, Sr. et al. ......... 426/141 |
| 3,879,566 A | 4/1975 | Cox et al. .................. 426/309 |
| 4,085,234 A | 4/1978 | Kamada et al. ............. 426/618 |
| 4,166,868 A | 9/1979 | Ando et al. ................. 426/441 |
| 4,233,327 A | 11/1980 | Ando et al. ................. 426/242 |
| 4,333,960 A | 6/1982 | Barry et al. ................. 426/625 |
| 4,361,593 A | 11/1982 | Brooks et al. .............. 426/627 |
| 4,385,074 A | 5/1983 | Weibye ...................... 426/462 |
| 4,478,862 A | 10/1984 | Greethead ................... 426/450 |
| 4,548,830 A | 10/1985 | Koyama ..................... 426/620 |
| 4,582,713 A | 4/1986 | Hirokawa et al. ........... 426/233 |
| 4,649,055 A | 3/1987 | Kohlwey .................... 426/449 |
| 4,734,289 A | 3/1988 | Yamaguchi et al. ......... 426/302 |
| 4,810,506 A * | 3/1989 | Lewis et al. ................. 426/28 |

(List continued on next page.)

FOREIGN PATENT DOCUMENTS

| | | |
|---|---|---|
| EP | 0352939 | 1/1990 |
| EP | 0216877 | 3/1992 |
| GB | 657691 | 4/1948 |
| JP | 3173548 | 4/1988 |
| JP | 3087153 | 4/1991 |

OTHER PUBLICATIONS

"Integration between Hydrothermic and Mechanical Processing of Rice" by Franco Gariboldi presented at the Third International Conference on Rice at the Rice Technology Training Centre, Alexandria, Egypt, Sep. 22–25, 1986.

"Processing Conditions of Parboiled Rice and It's Qualities" by Kazuhiko Itoh and Shuso Kawamura, Nippon Shokubin Kogyo Gakkaishi vol. 32, No. 7, 471–479 (1985).

Study on Parboiling of Brown Rice (Japonica), T. Nagashima, K. Takano, Y. Suzuki, T. Baba, L. Kamoi, Journal of Agricultural Science (Tokyo Nogyo Daigaku Nogatu Shuho) 1983 28 (2) 238–243.

Primary Examiner—Arthur L. Corbin
(74) Attorney, Agent, or Firm—Fulbright & Jaworski L.L.P.

(57) ABSTRACT

The invention provides a process for the preparation of quick cooking rice having a natural appearance and smooth mouthfeel. The rice is produced by mechanically manipulating wet rice at a moisture content of from more than 17% to 32% by weight, preferably by wet milling the rice to remove the bran, followed by drying. The wet milling results in a product with quick cooking properties, superior cook yield and eating properties. The mechanically manipulated wet rice can also be instantized after the wet flexing step to produce an instant rice. Accordingly, the invention provides quick cooking and instant rices obtainable by the claimed processes.

15 Claims, 16 Drawing Sheets

U.S. PATENT DOCUMENTS

| | | | |
|---|---|---|---|
| 4,810,511 A | * | 3/1989 | Velupillai et al. ............ 426/242 |
| 4,857,348 A | | 8/1989 | Abraham et al. ............ 426/462 |
| 4,886,675 A | | 12/1989 | Jodlbauer .................... 426/242 |
| 4,902,528 A | * | 2/1990 | Groesbeck et al. .......... 426/625 |
| 4,952,416 A | | 8/1990 | Abraham et al. ............ 426/462 |
| 5,045,328 A | | 9/1991 | Lewis et al. ................... 426/28 |
| 5,130,153 A | * | 7/1992 | McIlroy et al. .............. 426/242 |
| 5,183,682 A | | 2/1993 | Lai ............................. 426/636 |
| 5,208,063 A | | 5/1993 | Andrews et al. ............. 426/482 |
| 5,275,836 A | * | 1/1994 | Lewis et al. ................. 426/627 |
| 5,316,783 A | | 5/1994 | Kratochvil et al. .......... 426/627 |

* cited by examiner

METHOD OF MAKING QUICK COOKING AND INSTANT RICE

This application is a divisional of application Ser. No. 08/671,363, filed Jun. 27, 1996, now abandoned.

BACKGROUND OF THE INVENTION

1. Field of the Invention

The present invention relates to processes for the preparation of quick cooking and instant rices, and to quick cooking and instant rice products obtainable thereby.

2. Description of Related Art

The references cited hereinafter, each hereby incorporated by reference, pertain to the field of this invention.

Rice is one of the leading food crops of the world, second only to wheat in terms of annual production for food use. It is the main staple food for about 60% of the world's population. About 90% of the world's rice is produced and consumed in Asia. Rice is a semi-aquatic, annual grass which can be grown under a broad range of climatic conditions. Cultivated rice is designated as either *Oryza sativa* L. or *Oryza glaberrima* Steud. *O. Sativa* is the predominant species; *O. Glaberrima* is grown only in Africa on a limited scale.

The gross structure of the mature rough rice grain is shown in FIG. 1 (From *Rice: Chemistry and Technology,* Edited by Bienvenido O. Juliano, page 18 (1985)). The principle parts of the grain are the hull, pericarp, seed coat, nucellus, embryo, aleurone layer and endosperm. The hull is the outer covering of the caryopsis (brown rice). The hull comprises 18–20% by weight of the rough rice and serves a protective function against insect infestation and environmental fluctuations. Removal of the hull from rough rice by dehulling exposes the rice caryopsis. The outer four morphologically distinct layers of the caryopsis are the pericarp, seed coat (Tegmen), nucellus and aleurone. Along with much of the embryo (germ), these layers comprise the bran portion of the rice grain. Although the aleurone layer is botanically part of the endosperm, it is removed as part of the bran fraction during milling. The bran portion accounts for 5–8% of the brown rice weight and is the most nutritious part of the caryopsis. The cells of the aleurone layer, in particular, consist of many inclusions called protein bodies and lipid bodies. Accordingly, raw untreated milled rice has a reduced nutritional value since the nutrient bran layer is removed.

Cooking rice typically involves allowing the rice to absorb water and heat. For example, rice may be cooked by placing the rice in boiling water for a period of time. Alternatively, rice may become cooked by steaming. Parboiled rice will typically absorb from 65 to 75 weight percent water during cooking. Water is taken up on cooking linearly with time. Hence reducing cooking time reduces water uptake. This is significant, decreasing from 180 grams for 100 grams of dry rice at 18 minutes to 120 at 10 minutes and 100 at 8 minutes. Low water uptake leaves the rice tasting soft on the outside and firm, chalky and uncooked on the inside (water uptake is the weight increase from long dry rice after cooking in excess water for a given time). Water absorption is defined as the weight of cooked rice yields from 100 g of dry rice after a given time.

Cooked rice typically has different mechanical properties compared to the original rice. The extent of cooking necessary for acceptable mouthfeel and taste varies from region to region. In the United States, for example, a softer rice product is often found desirable, whereas Europeans typically desire a harder or firmer rice. The following is a list of terms often used to characterize the mouthfeel characteristics of cooked rice (see *Rice: New Evaluation Methods,* by Kohlway, page 120):

| | |
|---|---|
| Firmness | Force required to compress cooked rice between the molar teeth on the first chew. The degree can range from soft (low), firm (middle), to hard (high) degree of firmness. (Also called hardness in texture literature). |
| Adhesiveness | Force required to remove cooked rice that adheres to the mouth (during eating), itself, and serving utensils. The degree can vary from flaky (low) to sticky (high). |
| Springiness | Degree to which cooked rice returns to its original shape once it has been compressed between the teeth. The degree can vary from viscous flow (low) to rubbery (high). |
| Cohesiveness | Internal force holding a grain together before it breaks, when compressed between the teeth. The degree can vary from mushy (low), tender (middle), to leathery (high) or brittle in al dente cooked rice (high). |
| Chewiness | Length of time (in seconds) required to masticate cooked rice at a constant rate of force application to reduce it to a consistency suitable for swallowing. |
| Fracturability | Force with which cooked rice crumbles. A high degree would be a rice with a high degree of hardness and a low degree of cohesiveness. |
| Gumminess | Denseness that persists throughout mastication; the energy required to disintegrate cooked rice to a state ready for swallowing. This term is a composite of hardness and cohesiveness. Degree would range from mealy (low) to gummy (high). |
| Starchiness | Describes the type of surface moistness. The condition can range from dry and flaky (low) to wet and starchy (high). |
| Tooth pack | Relates to bits of cooked rice sufficiently adhesive and gummy that they lodge in the cusps of the molar teeth. This is primarily a defect with extrusion-cooked rice, but can be found in precooked rice that is not fully cooked. |

Raw white rice is not parboiled, but is milled from brown rice in the dry raw state. It generally cooks faster than parboiled rice. Raw white rice typically requires cooking times of around 12–18 minutes. The resultant cooked rice, however, is extremely starchy tasting. It is believed that water and heat enters the individual starch granules within the rice kernels and causes them to swell and burst releasing free molecular starch. This yields a very starchy, pasty feel in the mouth.

Parboiling is the typical method employed for reducing the starchiness of cooked rice. Parboiled rice is usually defined as rice which has been steeped, heat treated and dried. During the heat treatment step of parboiling, the starch in the endosperm of the rice is substantially gelatinized. The parboiling process and the resulting gelatinization of the starch have several beneficial effects. Parboiling allows the nutrients from the bran layer to migrate to the internal portions of the rice before removal resulting in a rice product having enhanced nutritional values. Moreover, parboiled rice is preferred over white (raw/milled) rice by many consumers for its texture, appearance, flavor, aroma and recipe tolerance.

Conventional parboiling processes generally include the steps of: (1) soaking rough (or paddy) rice in 50–70° C. water for 2–4 hours to yield a rough rice having a 30–35 weight percent water content; (2) draining the free water from the soaked rice; (3) applying steam heat under pressure for 8 to 20 minutes to effect gelatinization; and (4) drying the steamed rice with hot air to reduce its water content to about 12–14 weight percent water. The dried, parboiled rough rice is then ready for shelling (to remove the hull) and milling to remove the bran.

Parboiling has been an active topic in the patent literature. There have been numerous efforts to improve upon the basic technology. For example, U.S. Pat. No. 5,017,395 teaches an extra predrying step at an elevated temperature. U.S. Pat. No. 4,810,511 prescribes use of microwave energy for partial gelatinization. According to U.S. Pat. No. 4,361,593, the rice starch is not completely gelatinized during steaming, and a tempering step is performed under non-gelatinizing conditions to reduce subsequent rupturing. In U.S. Pat. No. 4,338,344, there is disclosed an inclined enclosed chamber where rice is cooked in hot water in a first zone at a lower end, and then is steamed in a second zone at an upper end.

Although parboiling provides a rice product having these improved characteristics, the resultant parboiled rice is rendered longer-cooking than milled white rice. Most parboiled rice requires emersion-cooking of at least 20 minutes to prepare the parboiled rice to the desired edibility. It appears that the heat treatment involved in the parboiling processing reduces the product rehydrability which renders it harder and thus longer to cook. Another drawback of conventional rice parboiling processes vis-a-vis white rice milling is that they result in stronger bonding of the bran layer to the rice kernel, with the result that more time and energy must be used in the milling step to remove the bran from the surface of the kernel subsequent to the parboiling.

Accordingly, although parboiled rice shows a great degree of improvement in its freedom from starchiness as well as other advantageous properties, these advantages are partly offset to a degree by the increased cooking time required to fully rehydrate the dry parboiled rice to achieve a cooked product.

Therefore, it would be advantageous to provide a parboiled rice product having reduced cooking times. Rice products having faster cooking times have previously been made primarily by methods that incorporate additional steps following the conventional parboiling operation to alter the original shape and/or by chemically changing the structure of the rice. The former including: (a) size reduction, (b) puffing or, (c) extrusion. Examples of the later chemical processes include: (a) enzymatic treatment or (b) rice protein modification. These prior art methods do not provide a rice product having an original natural appearance in size, texture, shape, color, flavor or mouthfeel.

"Size reduction" improves cooking times by reducing the thickness of the individual rice kernels. A reduction in the rice thickness reduces the cooking time since the rice kernel becomes fully hydrated quicker. That is, a reduction in thickness reduces the time it takes for moisture to migrate to the center of the rice kernel. U.S. Pat. No. 2,733,147 to Ozai-Durrani relates to a method of preparing a quick cooking rice product by subjecting whole rice, the external portions of which comprise moist and completely gelatinized starch in a completely soluble condition and the internal portions of which comprise starch ranging from a very slight degree of gelatization and pliability to complete gelatinization and pliability, to mechanical compression so that the structure of the grains is modified without reducing the grains to a flaked condition. The patent discloses that for rice soaked and precooked according to the conditions described above, it has been found that the thickness of the grains should be reduced from about 30% to about 80% of their original (or regular rice) thickness in order to provide a rehydrated product having the texture and other characteristics of regularly cooked rice at a reduced cook time. U.S. Pat. No. 5,045,328 to Lewis et al. relates to the compression of parboiled rice with high moisture content by cold-rolling to effect the cooking properties of the rice.

Although the methods relying on "size reduction" result in a rice product having reduced cooking times, the product has an unnatural appearance and modified mouthfeel as a result of the altered shape and size. Moreover, these methods require an addition process steps and pieces of machinery (cold-rolling or compression apparatus) to effect the size reduction.

Methods that utilize a "puffing" step decrease the cooking time by increasing the volume of the rice product, thereby decreasing the density. The result is a porous structure that is easily rehydrated. The puffing processes include: (1) atmospheric pressure procedures, which rely on the sudden application of heat to obtain the necessary rapid vaporization of water, and (2) pressure-drop processes, which involve sudden transferring of superheated moist particles into a space at lower pressure. The puffing phenomenon results from the sudden expansion of water vapor (steam) in the interstices of the granule (See *Rice, volume II: Utilization*, Second Edition, Edited by Bor S. Luh, page 180).

U.S. Pat. No. 2,438,939 to Ozai-Durrani relates to treating rice with moisture and heat in such a way as to gelatinize the starch and cause the grains to soften and swell substantially beyond their original size and then drying the swollen grains in such a manner as to preserve their enlarged size and produce a porous structure throughout the grains as a result of the shrinkage of the internal starch. The process results in a rice product comprising dried, separate, substantially gelatinized rice grains having of the order of twice their original volume and a porous structure capable of ready hydration to individual grains having the soft, palatable character of ordinary cooked rice. U.S. Pat. No. 4,166,868 to Ando et al. relates to frying compressed rice having a moisture content of 8–25% to form a puffed ready-to-eat rice product. U.S. Pat. No. 4,233,327 to Ando et al. relates to puffing and drying pressed rice having a water content of 8–25% by weight by hot air or high frequency dielectric heating to form an instant-cooking rice product.

Although the "puffing" method results in a rice product having improved cooking times, the product has an unnatural appearance and modified mouthfeel as a result of the altered shape, surface texture and size.

Methods involving "extrusion" decrease the cooking time of rice by forming a pasta-like substance by extruding a mass of rice product. The resultant extruded product is similar to pasta and has a significantly different appearance and mouthfeel compared to conventional rice.

The above described methods are also disadvantageous since each requires at least one additional step and/or apparatus for the rice processing. The methods involving the reduction of the kernel thickness, for example, require the separate step of compressing the kernels.

Other methods of reducing the cooking times of rice include those described in the following references.

U.S. Pat. No. 4,810,506 to Lewis et al. relates to a process of producing a grain product which comprises subjecting parboiled grains to treatment with a measured quantity of a solution containing water and an enzyme. Preferably, the parboiled grain is subjected to compression while still hot by passing the grain between rollers prior to treatment with the enzyme containing solution.

U.S. Pat. No. 3,879,566 to Cox et al. relates to a process for preparing a quick cooking rice that modifies the protein component of the rice so that water will be more available to the starch component for imbibition and to modify the starch component of the rice to increase its hydrophilic characteristics.

Here, the rice grains are not subjected to mechanical action to modify their physical structure. Instead, molecular or internal structural modification of the chemical components of the rice grain is accomplished by the use of chemicals and heat treatment to facilitate penetration of water into the rice grains during preparation of the quick cooking rice and also during its final cooking to palatable condition. This chemical alteration of the rice can result in a foreign flavor or color in the cooked rice product.

The above-described methods do not provide a quick cooking parboiled rice product having a natural appearance, flavor and/or mouthfeel. The natural appearance is important because, as widely accepted in culinary arts, the first impression of a food is generally visual. That is, the willingness of a person to eat a particular food depends largely on preconceptions as to appealing color and other visual cues. Appearance is an influential quality attribute pre-supposed by people to be an indicator of deteriorative changes undergone by food. Aroma and flavor can also be influential upon smelling and tasting. Thus, an irregular appearance increases the likelihood that a food will be rejected, and this phenomenon jeopardizes the acceptability of rice amongst the majority of rice eating cultures around the world. This is so to an even greater extent if the rice has a foreign flavor as a result of additives used to modify the cooking characteristics of the rice (i.e., enzymes or chemical reagents). It is desired that rice appearance be uniform and natural and that rice flavor be near bland and subtle.

Accordingly, it would be desirable to produce a quick cooking or instant rice having a natural appearance and flavor and a smooth surface texture without substantially altering the size and/or shape of the individual rice kernels and a method of making the same that does not significantly increase the cost and/or complexity in the manufacturing of fast cooked rice.

OBJECTS OF THE INVENTION

It is an object of the invention to provide an improved quick cooking or instant rice product and a method of making the same.

It is a further object of the present invention to provide quick-cooking rice having a natural appearance and flavor and improved mouth feel, improved cooking yield, improved integrity of rice and method of making the same.

It is a still further object of the present invention to provide quick cooking rice having a smooth texture.

It is a still further object of the present invention to provide an improved quick cooking or instant rice without significantly adding to the cost and/or complexity of the rice processing or requiring the use of chemical reagents or enzymes.

The foregoing and other objects and advantages of the invention will be set forth in or apparent from the following description.

SUMMARY OF THE INVENTION

The invention relates to quick cooking and instant rice products and to methods of making the same. More specifically, the invention relates to a process including the step of mechanically manipulating rice having a high moisture content to result in a rice product having enhanced cooking characteristics. The resultant products have a natural appearance and flavor and improved mouthfeel characteristics, improved cooking yield and integrity of rice. Preferably, the step of mechanical manipulation is achieved by milling high moisture rice. By milling high moisture rice directly or shortly after parboiling, a quick cooking rice is achieved without adding any additional processing steps or using any chemical reagents or additives. The additional steps of conventional quick cook rice processes such as rehydration, compression and hot air puffing can be eliminated. In fact, the present invention simplifies or reduces the costs associated with preparing quick cook or instant rice since the conventional drying and rehydration steps immediately after the parboiling can either be omitted or greatly reduced since the rice is milled while wet.

It has been found, surprisingly, that the present invention substantially reduces the cooking time required compared to the parboiled, dry milled rice. In particular, this process can be used to produce a quick cooking rice that gives an acceptable texture after boiling in water at about 100° C. for only 10–12 minutes or less, e.g., 6–10 minutes, more preferably 5–8 minutes. The precise cooking time of the rice depends on certain parameters including the rice variety and the exact moisture content in the wet manipulation step. However, a significant reduction of cooking times is observed for all rice varieties so far tested, and also for moisture contents in the range from above 19% to 32% by weight. The preferred rice varieties include Panda, Pelde, Thaibonnet, Gulfmont, Katy and Cypress.

Another aspect of the invention relates to the formation of an instant rice product produced by additionally subjecting the wet milled rice to puffing to result in a rice product having further reduced cook times. An instant rice product can be achieved without the step of rehydrating the conventionally, dry milled rice since the wet milled rice already has a high moisture level after milling. The resultant instant rice preferably has a cooking time of less than about 8 minutes, advantageously less than about 7 minutes, even better less than 6 minutes and most preferred less than 5 minutes.

BRIEF DESCRIPTION OF THE DRAWINGS

Specific embodiments of the present invention will now be described further, by way of example, with reference to the accompanying drawings, in which:

FIG. 12(a) is at 25×magnification and FIG. 12(b) is a 1000×magnification;

FIG. 13(a) is at 25×magnification and FIG. 13(b) is a 1000×magnification;

DEFINITIONS

Figure 1:
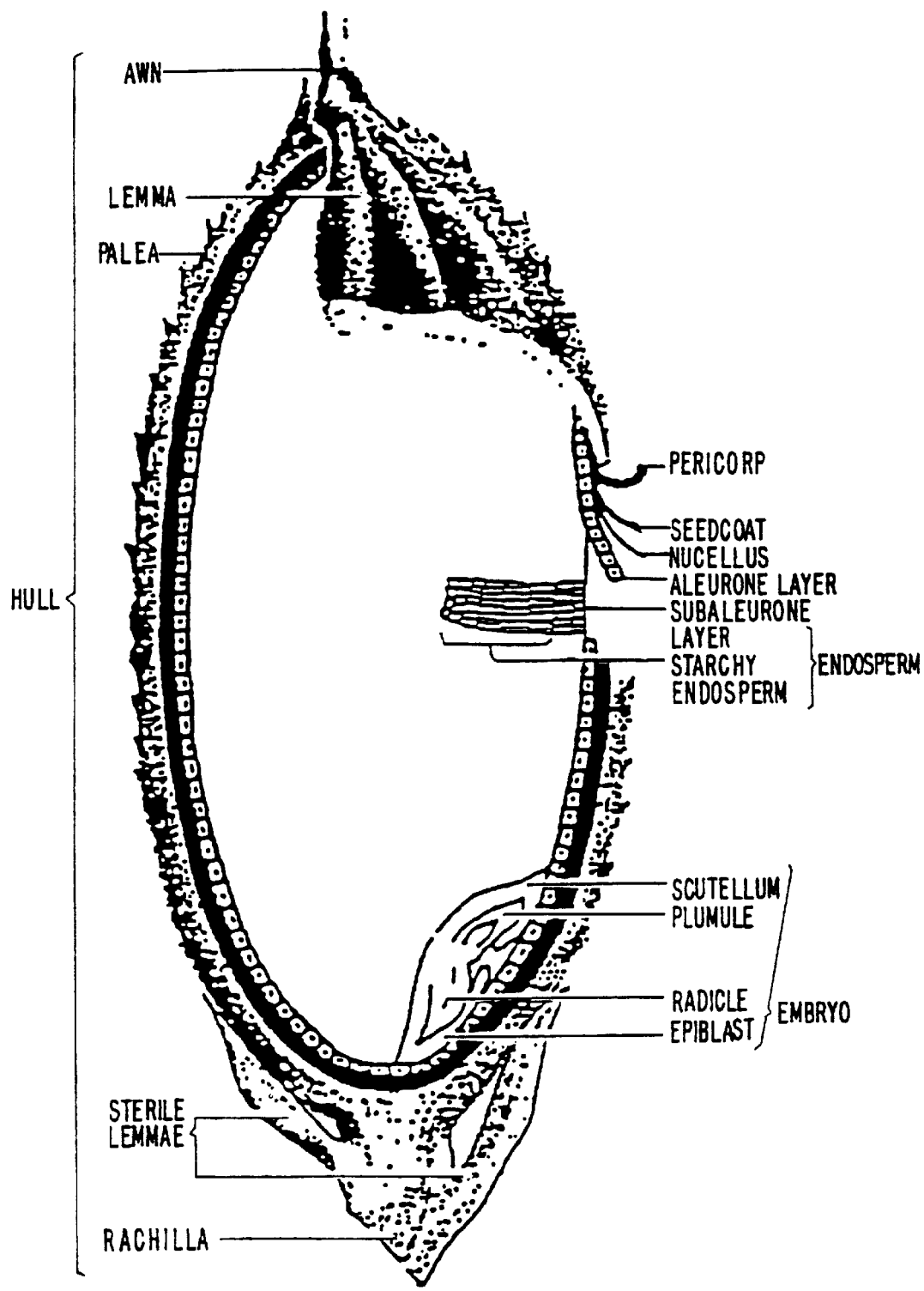
FIG. 1 illustrates a cross-sectional schematical view of a rough rice kernel.

The term "physical property" means an inherent, measurable property of a compound or composition, e.g., surface area, mechanical properties, density, porosity, etc.

The term "relatively" means that ninety-five percent of the values of the physical property when measured along an axis of, or within a plane of or within a volume of the structure, as the case may be, will be within plus or minus 20 percent of a mean value.

The term "substantially" means that ninety-five percent of the values of a physical property when measured along an axis of, or within a plane of or within a volume of the structure, as the case may be, will be within plus or minus ten percent of a mean value.

"Cooking time" is notoriously a "loose" concept. The cook time of rice may be defined in terms of its texture as determined rigorously and reproducibly by trained taste panels. This term is discussed further below.

The term "brown rice" refers to any rice having part or all of the bran layer still attached to the rice kernel. Sometimes brown rice is referred to as cargo brown.

The term "paddy rice" refers to rice with husk (i.e., not dehulled).

Unless otherwise stated, moisture contents are given as percent moisture by weight based on the total weight of the rice (i.e., wet weight basis).

DESCRIPTION OF THE PREFERRED EMBODIMENTS

It has now been found that milling rice that has been parboiled (for example by the processes described in EP-A-0 352 239 and U.S. Pat. No. 5,316,783) while the rice is still wet results in a rice product surprisingly having an entirely substantially natural appearance, reduced cooking time, improved cooking yield comparing at the same cook time (i.e., more servings for food service applications), softer cooked texture and other related advantages. Without wishing to be bound by any theory, it is believed that the more rapid cooking of the wet milled parboiled rice produced by the process of the present invention is due to the creation of many small fissures uniformly formed throughout the rice grain, invisible to the naked eye.

Although it is known to mill parboiled paddy rice while it is slightly moist and flexible in order to reduce milling losses—specifically it reduces the quantity of broken rice and reduces the total energy required to produce milled rice from brown rice, such methods use moisture levels less than 17%. Lower moisture contents during milling result in higher breakage of the rice because the rice becomes friable. Such methods of milling carried out on paddy parboiled rice at a moisture content of 15.5 to 16.5% have been previously described (See paper entitled "Integration Between Hydrothermic and Mechanical Processing of Rice" presented at the Third International Conference on Rice at the Rice Technology Training Centre, Alexandria, Egypt, on Sep. 22–25, 1986). The milling of parboiled rice having moisture contents of about 16.5% or less has not hitherto been used to prepare a quick cooking rice, but instead used solely to reduce rice breakage during milling. Higher moisture levels were previously avoided since it was believed would result in the milled ride and loose bran sticking to the milling apparatus and eventually blocking the milling chamber or otherwise detrimentally interfering with the flow through the milling machine.

In conventional rice mills, harvest rice or parboiled rice are dried down to a stable moisture range before the milling operation. However, at higher moisture levels above 19%, the parboiled rice product is softer and more pliable. Surprisingly, such high moisture levels can be used without detrimentally interfering with the flow of rice through the milling machine. Accordingly, when the high moisture rice is milled, the product flexes rather than breaks. This flexing of the high moisture rice apparently causes internal disruption of the starch cells or internal structure. It is believed that this internal disruption results in microsized crevices which provide capillaries which allow moisture to diffuse into the rice and results in a rice product that cooks faster without further treatment.

When parboiled rice is dried to below 17% moisture, gelatinized starch polymers recrystallize and the rheological property changes from viscoelastic to glassy. Therefore, rice milled at moisture below about 17% moisture is purely by abrasive action of the rice grains to each other and against the milling stone. Rice may also be milled by friction mill (without the abrasive milling stone) at low moisture range because of the hardness of the rice.

Unlike the brittleness in white rice (un-parboiled) or the partially parboiled rice structure in the conventional parboiled rice, fully parboiled rice has a consistent gelatinized uniform texture throughout the grain. At medium to high moisture (above 19% w.b.), the grain is flexible, pliable and elastic (rubbery). The surface of the rice is slightly harder than the center because of drying. At this moisture range, rice grain can bend without breakage. The bran layer being more brittle, will crack transversely when subjected to longitudinal bending. But the rice is only breaking up to the subaleurone layer and the bending does not result in damaging the pre-gelatinized starch endosperm. With sufficient mechanical work (preferably by milling) the bran layer (a layer of protection) is either rubbed off or broken into pieces from the endosperm. With the bran layer removed during milling, the soft endosperm bends even more easier since it is free of the stiff bran layer. In the mill, the bran is rubbed off in the milling action and by the peeling on the stone. The flexing of the grain eventually causes the loosening of the bi-membrane cell wall in the endosperm and the disruption the intracellular structure. The effect is faster water absorption and fast cooking characteristics.

The rice product made according to the present invention maintains its natural appearance (i.e., size, shape and texture). The invention relates to individual rice kernels or a multiplicity of kernels. When produced in mass, substantially all of the kernels will have the quick cook properties. Preferably, greater than 50% have the properties, advantageously greater than 75%, even better greater than 90% and most preferred greater than 95%.

One advantage of the present invention is the reduced cooking times for the rice. One useful parameter for characterizing the level of cooking is water absorption rates. Milling at higher moisture results in higher water absorption rates on cooking the rice as shown in Table I. Table I shows the water absorption values at certain time intervals of rice made according to the invention compared to comparative rice products.

Interestingly, the long grain rice products made according to the invention had a water absorption value greater than the medium grain rice product prepared by conventional methods even though the medium grain rice has smaller dimensions and should, therefore, have high water absorption rates.

the grains disintegrating (i.e., splitting, developing open ends, etc.). That is, the wet milled rice exhibits an increased robustness and resistance to over cooking.

Accordingly, the present invention provides a quick-cooking rice having increased water absorption and reduced cooking times. Preferably, the quick-cooking rice has a cooking time of 6–10 minutes in boiling water at 100° C.. Even better, the quick cooking rice has a cooking time of 5–8 minutes under the same conditions.

Preferably, the relative cooking time of the rice made according to the invention is 10% less than the cooking time of the conventional dry milled rice product, advantageously 15% less, even better 20% less and most preferred 30% less.

The product should have a water absorption level greater than 220 grams water per 100 grams of dry rice after cooking in excess water for eight minutes. Preferably, the product should have a water absorption level greater than 230 grams per 100 grams of dry rice after cooking in excess water for ten minutes (preferably eight minutes), advantageously greater than 240, even better greater than 250, and most preferred greater than 260.

Preferably, the water absorption rate and/or amount for the rice made according to the invention increases by at least 5%, advantageously 10%, even better 15%, and most preferred 20% when compared to a conventional dry milled (14% moisture) rice.

The resultant rice product made according to the invention looks substantially the same in shape as the conventional parboiled rice both individually and in bulk (both

TABLE I

WATER ABSORPTION VALUES

| VARIETY/RICE TYPE | COOK TIME | | | | | | |
|---|---|---|---|---|---|---|---|
| | 8 | 10 | 12 | 15 | 16 | 18 | 20 |
| Thaibonnet (long grain) 24% moisture milled | 236 | 253 | 264 | 293 | — | 310 | 316 |
| Thaibonnet (long grain) 14% moisture milled | 203 | 220 | 231 | 252 | — | 275 | 289 |
| Ribe (medium grain) fast cook 14% moisture milled | 204 | 221 | 232 | 252 | 258 | 272 | 285 |
| Conventional fast cook brand #1 (long grain) | 207 | — | 240 | — | 270 | — | 299 |
| Conventional fast cook brand #2 (long grain) | 203 | — | 234 | — | 263 | — | 290 |
| Conventional fast cook brand #3 (long grain) | 204 | 219 | 232 | — | 262 | — | 289 |
| Lemont (long grain) regular cook 14% moisture milled | 200 | 216 | 229 | 253 | — | 275 | 287 |
| Arborio (medium grain) regular cook 14% moisture milled | 192 | 204 | — | — | — | 256 | — |

The minimal water absorption for a palatable rice is 220 grams.
Water absorption = cooked weight from 100 g dry rice after boiling in excess water at atmospheric pressure for the given time.

The increased water absorption provided by the present invention has several beneficial effects. It reduces cooking times providing a quicker cooking rice product. The higher water absorption characteristics also increase the cooking yield of the rice comparing at the same cook time—important for food service uses where weight on the plate and apparent portion size is important. Moreover, it improves mouthfeel (particularly lubricity). The resultant product preferably has a smooth glossy surface and smooth mouthfeel and/or distinct intact whole grain and fast cooking characteristics.

According to another embodiment of the invention, the wet milled rice may be cooked in boiling water (100° C.) for extended periods of time (i.e., greater than 15 to 20 minutes) to result in a cooked rice having whiter color, few split grains, soft texture and/or greater elongation. Surprisingly, it has been discovered that when the wet milled rice is cooked for extended periods of time, the water absorption can reach levels above about 300 grams per 100 grams dry rice without before and after cooking) when viewed by the naked eye (no or little magnification and no special lighting conditions). Moreover, the product preferably has a bulk density that is substantially the same as the conventionally prepared rice. The product typically has a bulk density of about 730 kg/m$^3$ minimum. Preferably, the largest change of any dimension of the rice kernel and/or its bulk density is less than 20%, advantageously less than 15%, even better less than 10% and most preferred less than 5%.

The texture of the resultant product is preferably smooth. It is believed that the smoothness is enhanced partly because the bran layer is pulled or peeled off as a result of the high moisture levels rather then scratched off (which is what is believed to occur during low moisture milling). Accordingly, the scratches or gouges typically caused during conventional milling are reduced or eliminated. In addition, since the rice kernel has increased flexibility during milling as a result of the high moisture, significant roughening of the surface is reduced. The result is a rice kernel having a smoother surface.

Figure 4:
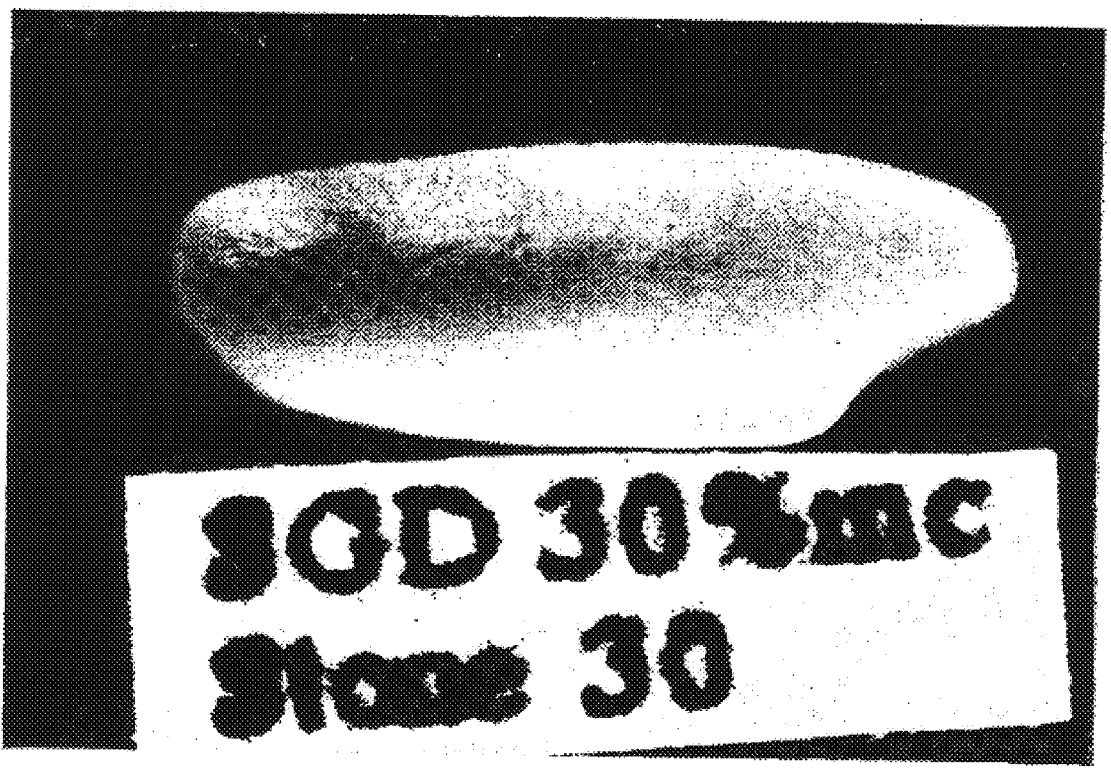
FIG. 4 is a photograph of a parboiled 30% moisture milled Gulfmont long grain under normal light conditions.

When seen under normal light conditions, the rice kernels made according to the invention have a substantially smooth, crack-free surface (FIG. 4). The rice kernel made according to the invention preferably has microcracks or fissures throughout a substantial portion of its surface when viewed using dark field or bright field illumination or using a stain (See FIGS. 5–9). Preferably, the rice product is substantially free of rough edges or cracks having a size or width greater than 0.2 mm (measured by staining). The average width of the cracks or fissures is preferably less than about 0.15 mm, advantageously less than 0.1 mm, even better less than 0.075 mm and most preferred less than 0.05 mm. Preferably, the kernels has a substantial number of microcracks or microfissures on the surface having average widths from 0.1 to 2.0 microns (determined by SEM without staining).

Preferably, the pattern of cracks or fissures forms a uniform web-like or mesh-like pattern throughout the surface of the kernel. The cracks or fissures are preferably substantially uniform in width, length, depth, spacing from one another and shape (See FIGS. 5 and 6). According to some preferred embodiments, the fissures or cracks form irregular lines or edges rather than smooth straight lines.

Most of the cracks or fissures visible at a magnification of 15× are oriented both perpendicular and parallel to the length of the rice kernel, however, substantially all of the fissures are perpendicular to the length (see FIGS. 5–9). Preferably, the ratio of the number of perpendicular or transverse fissures to the number of horizontal or longitudinal fissures is greater than about 2 to 1, advantageously greater than about 5 to 1, even better greater than about 8 to 1 and most preferred greater than about 10 to 1. Preferably, the ratio of total length of perpendicular or transverse fissures to the total length of horizontal or longitudinal fissures is greater than about 2 to 1, advantageously greater than about 5 to 1, even better greater than about 8 to 1 and most preferred greater than about 10 to 1.

The density of fissures is preferably uniform throughout at least 50% of the kernel surface, advantageously at least 75%, even better 90% and most preferred 95%. Preferably, the density of the cracks or fissures is substantially uniform throughout the length of the kernel surface. Advantageously, the kernels have an average crack density of one parallel crack per square mm and greater than 10 perpendicular cracks per square mm.

Figure 2A:
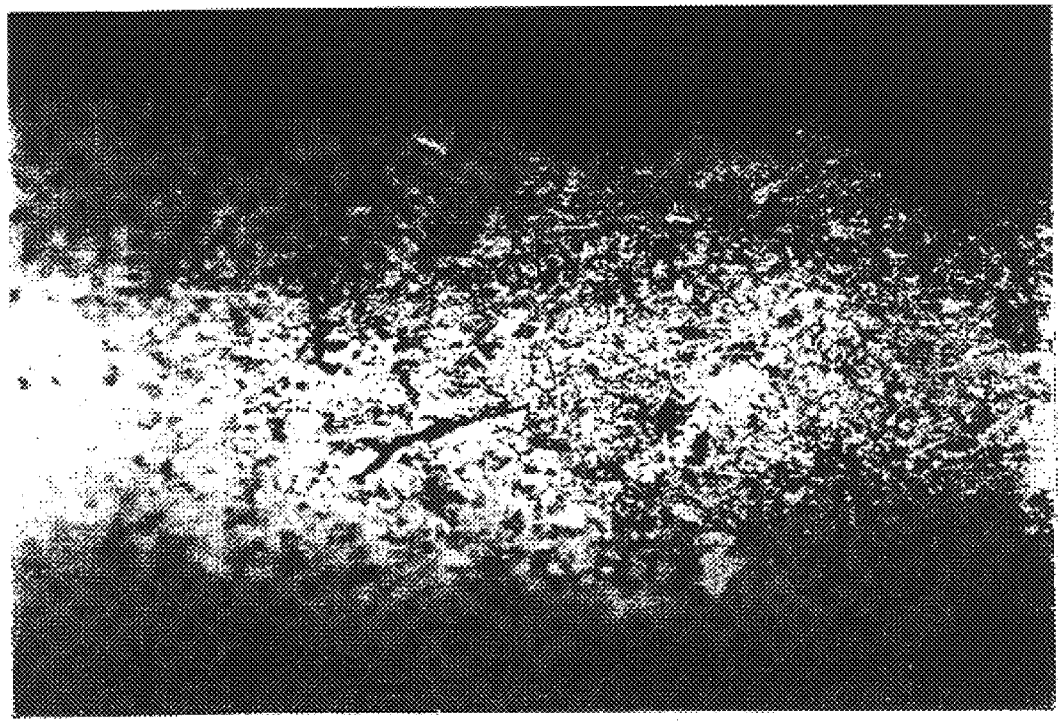
FIGS. 2(a) and (b) are photomicrographs (53×) of Thaibonnet rice kernels milled at 14% (FIG. 2(a)) and 17% FIG. 2(b) moisture having been stained with amido black/blood stain.
Figure 2B:
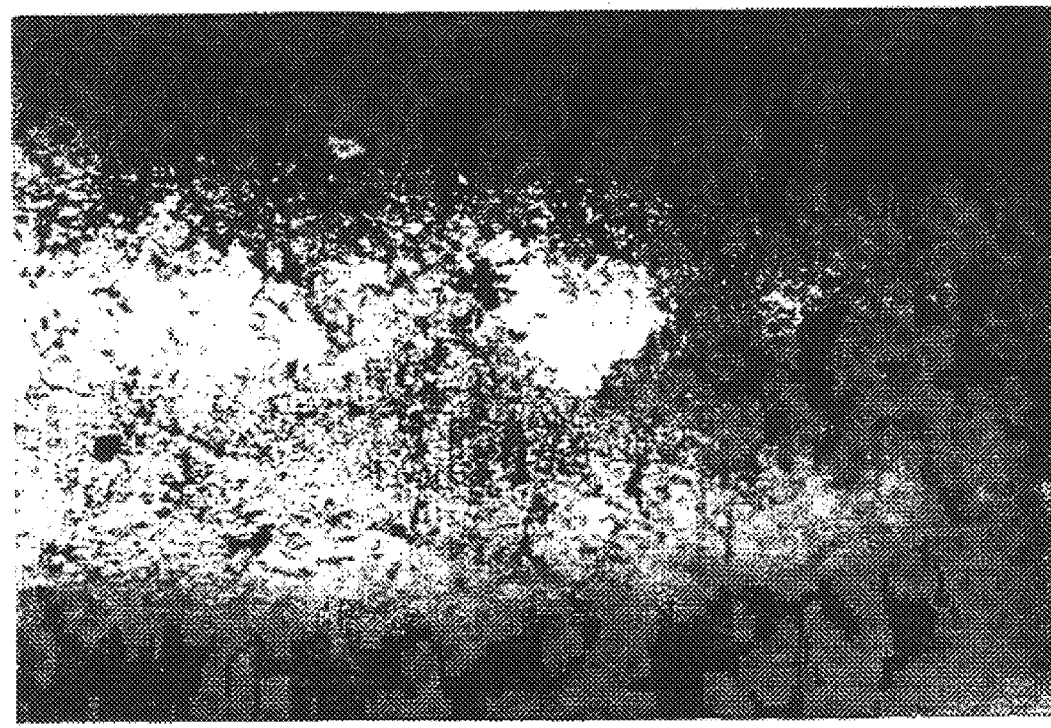
Figure 3:
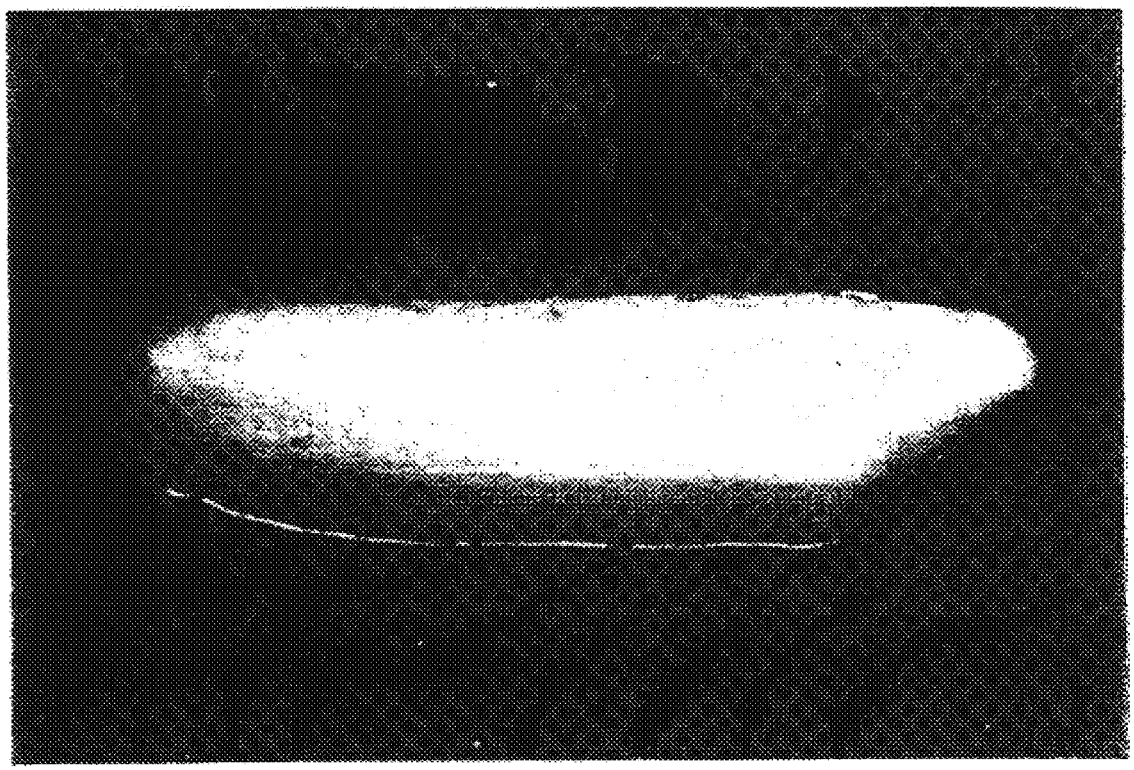
FIG. 3 is a stereomicrophotograph (15×) of a Thaibonnet rice kernel milled at 14% moisture.
Figure 5A:
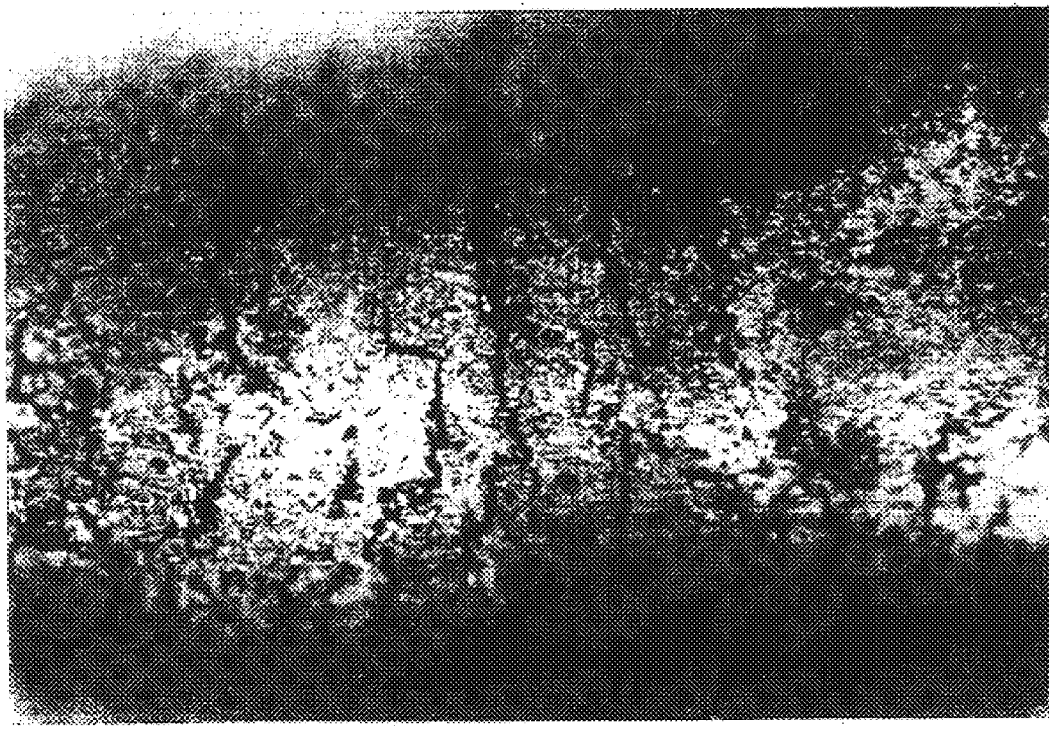
FIG. 5(a) and (b) are photomicrographs (53×) of Thaibonnet rice kernels milled at 19% (FIG. 5(a)) and 24% (FIG. 5(b)) moisture having been stained with amido black/blood stain.
Figure 5B:
Figure 6:
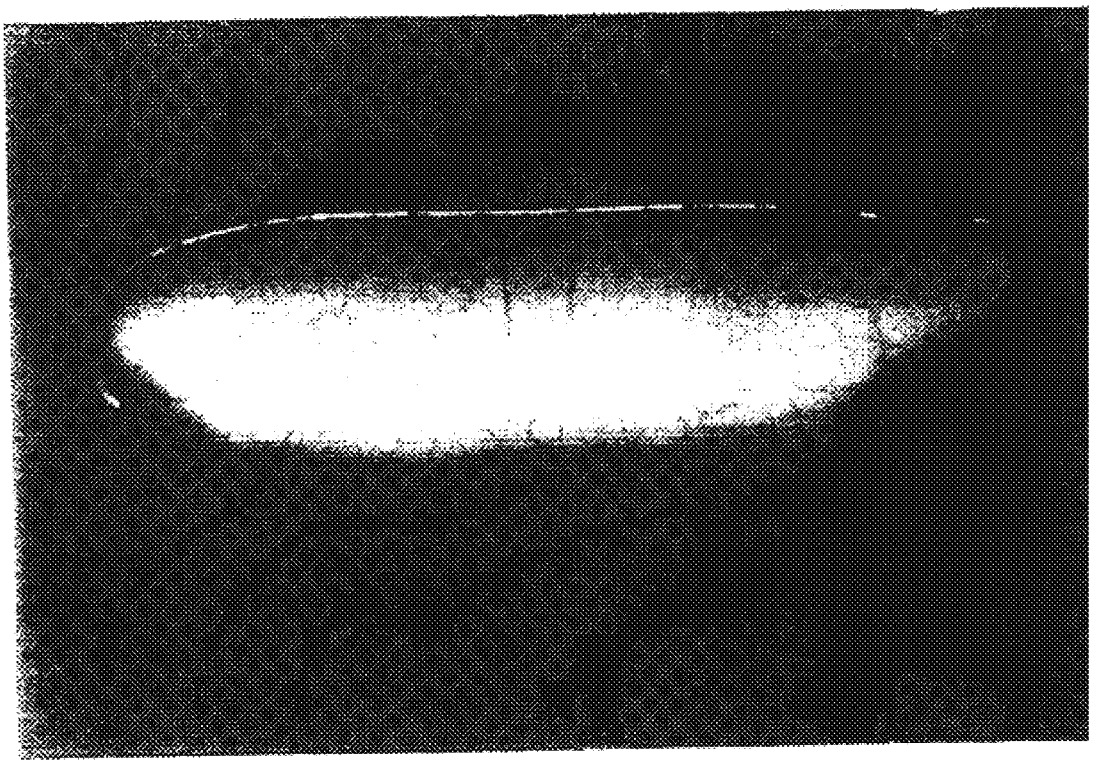
FIG. 6 is a stereomicrophotograph (15×) of a Thaibonnet rice kernel milled at 24% moisture.
Figure 7:
FIG. 7 is a microphotograph (75×) of a Thaibonnet rice kernel milled at 24% moisture using bright field transillumination.
Figure 8:
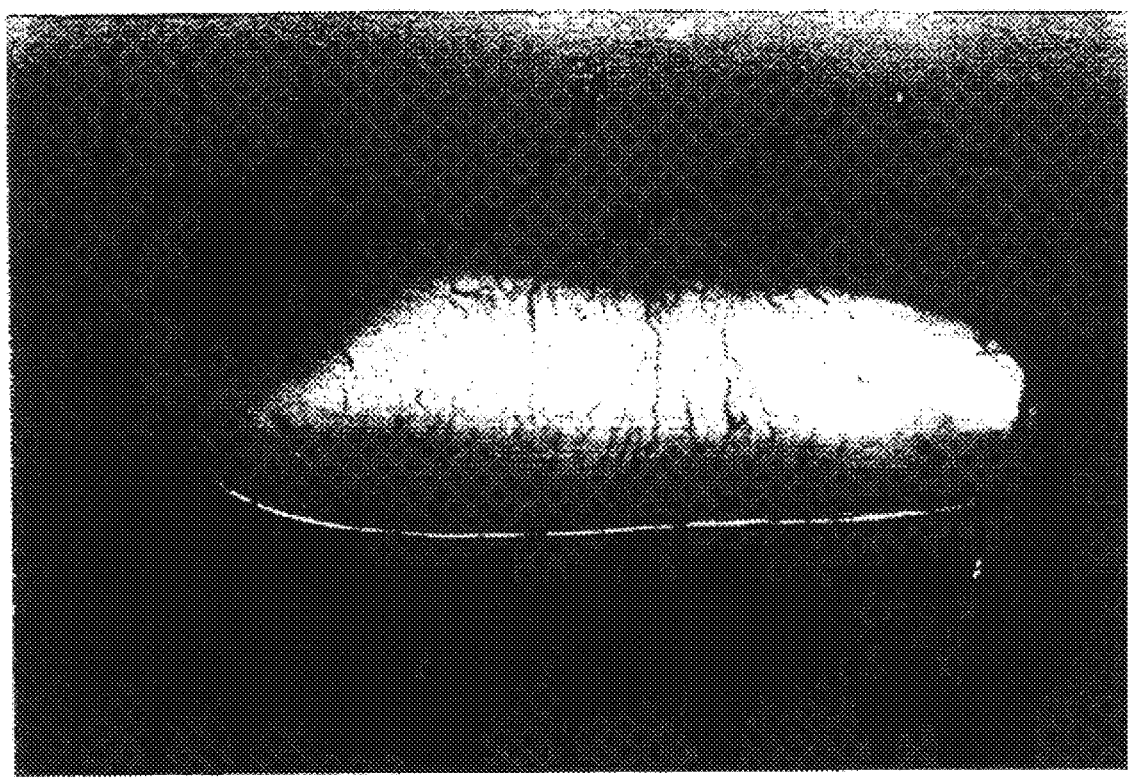
FIG. 8 is a stereomicrophotograph (15×) of a Gulfmont rice kernel milled at 27% moisture.
Figure 9:
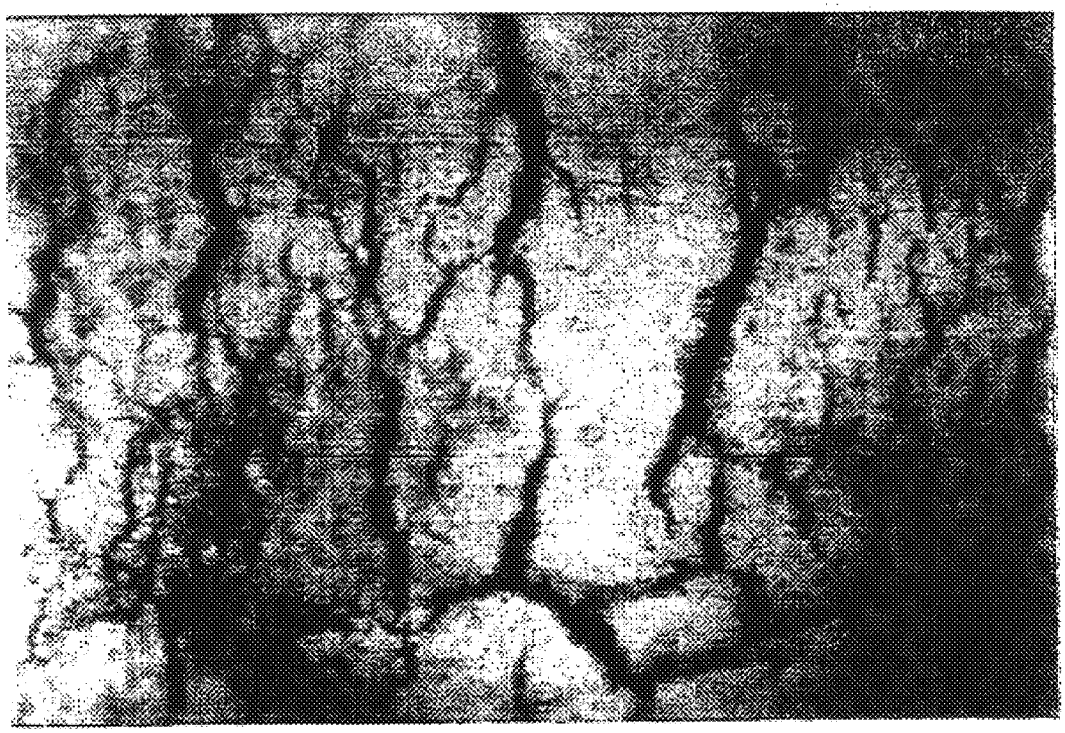
FIG. 9 is a microphotograph (75×) of a Gulfmont rice kernel milled at 27% moisture using bright field transillumination.

A comparison of various kernels can be made by referring to FIGS. 2 through 9. FIGS. 2–9 confirm the effect of high moisture milling on rice kernels. FIGS. 2 and 3 illustrate Thaibonnet rice kernels milled at 14% moisture. FIG. 4 illustrates a parboiled Gulfmont long grain rice kernel milled at 30% moisture. FIGS. 5–7 illustrate Thaibonnet rice kernels milled at 19% moisture (FIG. 5(a)) or 24% moisture (FIGS. 5(b), 6 and 7). FIGS. 8 and 9 illustrate Gulfmont rice kernels milled at 27% moisture.

FIGS. 2 and 5 are photomicrographs depicting various rice grains after the application of a stain. The differences in surface textures and cracking are particularly emphasized in these figures. Different types of stains were used on grains of rice from each sample. The rice grains were examined with a polarizing light microscope (PLM) to evaluate which stains would produce the most contrast between the structural elements. One stain produced desirable results. The stain used was a mixture of amido black and blood stain. Grains from each sample were immersed in the stain for approximately five minutes and allowed to air dry. They were then examined by PLM at a magnification of 53×. It was found that the stain highlighted differences in surface textures and structural cracks in the grains. Deeper blues (amido black/blood stain) indicate greater surface area and surface activity.

FIGS. 3, 6 and 8 are dark field transillumination stereomicrophotographs of representative rice grains having been milled at various moisture levels. The samples were unstained. The rice grains were photographed with an Olympus SZH stereomicroscope using dark field transillumination. The normal instrument objective magnification was 15×; a 3.3× photo ocular was used throughout. The total magnification on the 4"×6" prints is 15×.

FIGS. 7 and 9 are photomicrographs made using bright field transillumination. The rice grains were photographed with the Olympus BH-2 microscope, with bright field transillumination, using a 5× objective and a 3.3× photo ocular. The total magnification of these specimens is 75×. The purpose of the photomicrographs is to show the internal cracking at higher magnification. These higher magnification images help visualize the surface topography.

Referring to FIG. 3, a rice kernel having been milled at 14% moisture is shown in a stereomicrograph at 15×magnification. The kernel has a surface substantially free of cracks or fissures. However, the kernel does appear to have gouges or scratches in the surface which confirms the belief that the bran layer is scraped off when milled at low moisture levels.

The kernel depicted in FIG. 3 is compared to FIG. 6 which shows a stereomicrophotograph of a Thaibonnet rice kernel that has been milled at 24% moisture. As seen in FIG. 6, the resultant product has small cracks or fissures uniformly distributed across the kernel surface which are invisible to the naked eye. As can be seen by this stereomicrophotograph, substantially all the fissures are transverse. It is believed the fissures result in more rapid uniform penetration of hot water and steam into the interior of the rice kernel, thereby accelerating the cooking process.

FIG. 7 is a transillumination microphotograph (75×) of the 24% moisture milled Thaibonnet rice product. The fissures are all transverse and substantially uniformly spaced and patterned.

As can be seen in FIG. 8, the fissures are uniformly patterned over a portion of the kernel rather than the entire kernel (as shown in FIG. 7). This difference may be explained by the fact a different rice variety is used (Gulfmont vs. Thaibonnet). It is believed different rice varieties will be effected differently. Some may require higher or lower moisture contents during milling, for example, to achieve the same results. Additionally, the differences in appearance may be caused by the different moisture contents being used during milling (24% vs. 27%). Alternatively, the difference may have been caused by the fact the Gulfmont rice was milled in a horizontal milling apparatus (Satake RMB 10G) whereas the Thaibonnet rice shown in FIG. 7 was milled in a vertical mill (Satake VTA05). The horizontal mill may provide different force components of stress/strain compared to the vertical mill which may result in a different fissure pattern. In addition, the Gulfmont rice product was parboiled by a different method than the Thaibonnet rice. The former was parboiled by a process similar to the method corresponding to U.S. Pat. No. 5,316,783, whereas the latter was parboiled by a method corresponding to EP-A-0 352 939.

The distinctions may explain the differences between the kernels shown in FIGS. 7 and 8. However, both kernels have the improved cooking characteristics and mouthfeel properties. Despite all the differences in the material/method/apparatus as mentioned above, the very distinct fine fissuring pattern was observed in both wet milled samples.

The manipulation of the wet rice can be done by flexing, bumping, sonic energy, impacting or other physical forces that provide the desired result. As set forth above, the manipulation should result in the application force in a universal array of directions. For example, subjecting kernels to simple rolling results in a non-uniform application of force by squeezing. The kernel is simply compressed. Moreover, since the kernel is thicker in the center than at the ends, the center is subjected to a greater amount of compressive force. As a result, the magnitude of the force applied is nonuniform. However, if a series of flexible rollers are used, the forces applied provide a more uniform flexing, twisting and compression throughout the kernel.

Preferably, the manipulation is by milling. Milling subjects the kernels to a variety of forces including compression, flexing, bending, twisting, etc. As a result, the internal structure of the kernel is uniformly manipulated.

The crack density for grains from several stained samples was measured by counting the number of cracks per ten calibrated ocular fields of view at a magnification of 10×. Cracks parallel and perpendicular to the grains were counted. Measurement results are provided in Table II.

TABLE II

Summary of Crack Density

| SAMPLE | Cracks Parallel to Rice Grain per $mm^2$* | Cracks Perpendicular to Rice Grain per $mm^2$* |
|---|---|---|
| 1) 17% Thaibonnet | 0 | 0 |
| 2) 19% Thaibonnet | 0 | 8 |
| 3) 24% Thaibonnet | 2 | 12 |
| 4) Conventional fast cook brand #2 (long grain) | 0 | 6 |
| 5) Conventional fast cook brand #3 (long grain) | 0 | 0 |
| 6) Conventional fast cook brand #4 (long grain) | 0 | 0 |
| 7) Conventional fast cook brand #1 (long grain) | 1 | 9 |
| 8) 14% Thai Bonnet | 0 | 0 |

*Average for ten fields of view

Although the Brand #1 appears to have a high crack density, it did not have a high water absorption rate (see Table I). It is believed that the "cracks" examined in the stained sample were not cracks, but were instead simply surface irregularities. It is believed the fissures formed by wet milling according to the invention have a depth greater than 0.01 mm. This was confirmed by examining an unstained sample of the Brand #1 rice product which was found to be substantially crack-free.

As can be seen from Table II, the rice products made according to the present invention have different crack densities compared to conventional rice products. It is believed the uniform crack density of the kernels of the present invention provide the quick cooking properties, natural appearance and improved mouthfeel.

The process according to the invention involves the mechanical manipulation or flexing of parboiled rice kernels having high moisture contents wherein the manipulation or flexing results in a uniform application of strain and stress on the kernel throughout the kernel dimensions. This processing results in the application of an array of multicomponent forces on the kernels. The uniform application of stress and strain throughout the kernel allows for the creation of uniform cracks throughout the structure. Preferably, the method comprises the steps of:

a. husking—removing the hull from the raw paddy rice;
b. parboiling
c. partial drying (optional) and cooling;
d. removing the bran layer;
e. mechanically manipulating the kernels; and
f. drying to result in a fast cook rice.

Steps (d) and (e) can be switched chronologically or combined. Preferably, the bran layer is removed and the kernel is flexed simultaneously. In one preferred embodiment, the high moisture kernels are wet milled thereby removing the bran layer and simultaneously flexing the kernels.

According to another embodiment, the rice is processed by a method comprising the steps of:

a. subjecting paddy rice (i.e., not de-hulled) to hydration (preferably to a moisture of about 34%);
b. steaming the rice to parboil and gelatinize the rice;
c. drying to about 20–25% moisture; and
d. dehulling;
e. wet milling the rice;
f. drying to result in a fast cook rice product.

During the drying step (c), the outer layer of the paddy rice dries faster than the inner portions. As a result, although the overall rice moisture content may be 20%, for example, the moisture content is higher in the inner kernel portion of the rice, whereas the outer husk layer is drier. The husk needs to be relatively dry to facilitate removal.

One advantage of parboiling paddy rice (i.e., with the husk) is an increase in whole grain yield. During the parboiling, rice kernels that were previously broken are held together by the husk and glued back together by starch gelatinization. As a result, the overall whole grain yield is improved since the percentage of broken rice at the paddy rice stage is reduced by the "healing" that occurs during the parboiling. However, parboiling paddy rice results in a slightly darker color rice compared to the brown parboiling process.

Accordingly, the parboiling processor may involve brown rice (dehulled) or paddy rice (with hulls).

Figure 10:
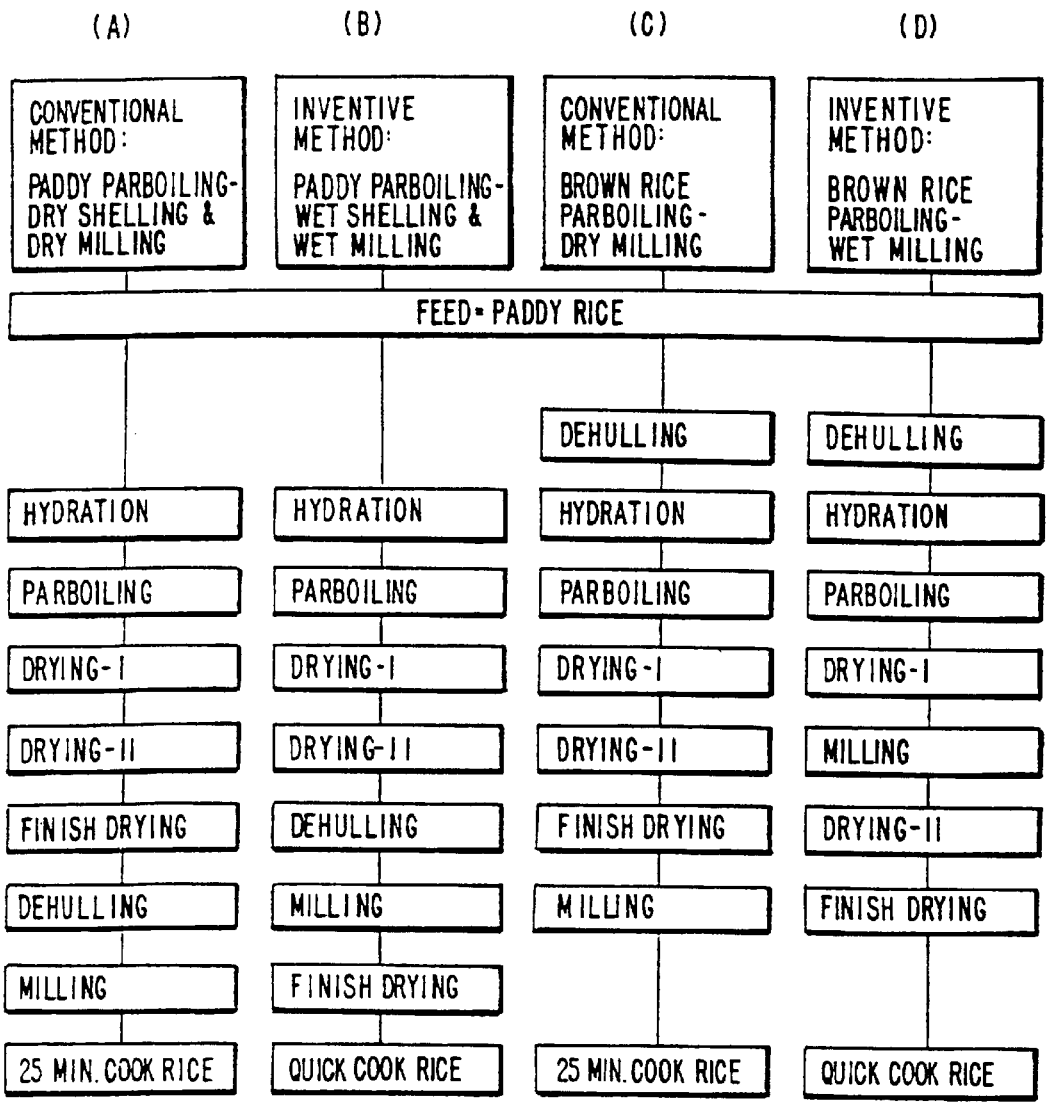
FIG. 10 illustrates a flow diagram of the steps in processes according to one embodiment of the present invention for producing a quick cooking rice product.
Figure 10:
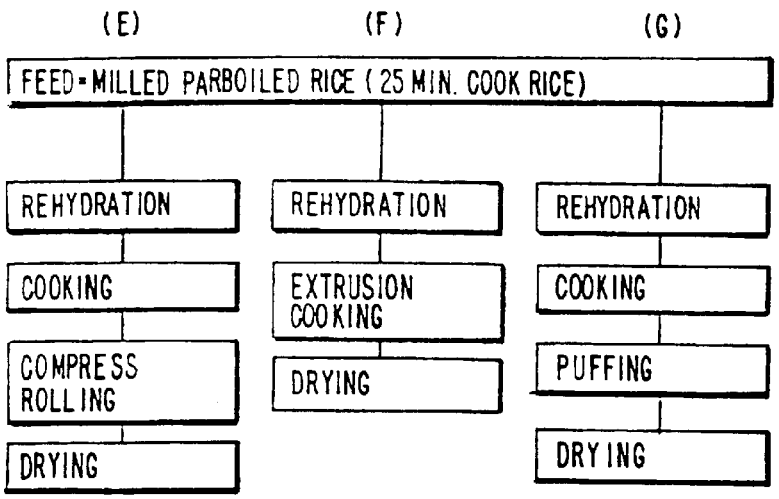
Figure 11:
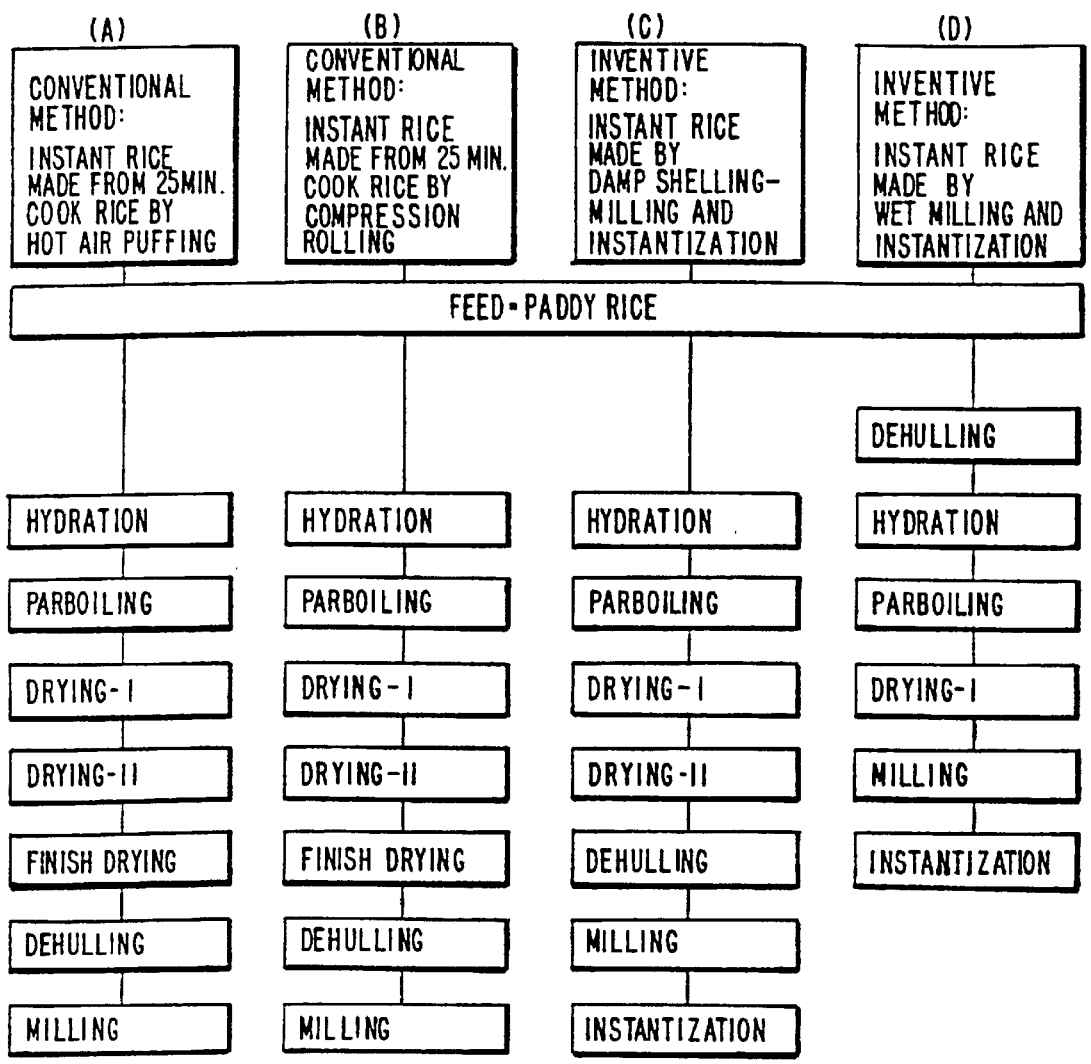
FIG. 11 illustrates a flow diagram of the steps in processes according to one embodiment of the present invention for producing an instant cooking rice product.
Figure 11:
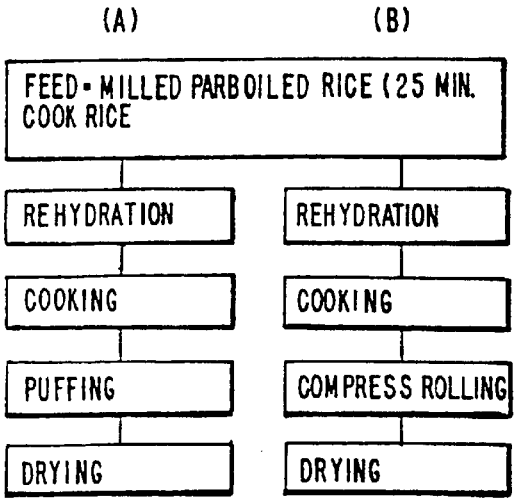

Other embodiments of the invention are illustrated by flow diagrams depicted in FIGS. 10 and 11. FIGS. 10(A)–(G) illustrate flow diagrams for methods according to invention compared with conventional processes for preparing quick cooking rice. FIGS. 11(A)–(D) illustrate inventive and conventional methods for preparing instant rice.

More specifically, FIGS. 10(A) and 10(C) illustrate flow diagrams of conventional methods of processing paddy parboiled rice using dry milling. FIGS. 10(B) and (D) illustrate several preferred embodiments of the present invention relating to the processing paddy rice using high moisture milling. As shown in FIGS. 10(B) and (D) some drying and cooking may occur prior to the milling. Drying I brings the moisture content down from 34% to 27%. Drying II from 27% to 20%. Finish drying from 20% to 13%.

The "additional steps" shown in FIGS. 10(E)–10(G) illustrate the additional steps that are necessary to produce quick cooking rice from conventionally dry milled parboiled rice. As can be seen by these flow diagrams, the present invention provides simpler and more cost effective methods of making quick cooking rice.

Similarly, FIGS. 11(A)–(D) are flow diagrams that illustrate the advantages of using the present invention for making instant cooking rice products.

According to one preferred embodiment, the rice is passed through at least two, preferably three milling machines. The milling can be vertical or horizontal. Preferably, the milling is vertical. Suitable milling machines include Satake Models RMB10G and VTA05 or similar larger size/capacity units or machines. Milling aids such as limestone powder may also be used. The type of milling stone used and the milling speed can be varied to optimize bran removal and quick cooking characteristics depending on the variety of rice.

The moisture content of the rice during milling should be anywhere from 17% to 35%, preferably from 19% to 30%, advantageously from 21 to 28% and most preferred from 23% to 25% moisture and above. The moisture content used depends on a variety of factors including the desired result, type of rice, the pretreatment of the rice (i.e., method of parboiling, etc.), the means for manipulation, etc. A moisture content as low as 17%, for example, may provide the benefits of the invention depending on these factors. The proper moisture content can be determined by varying the level and examining the results.

The precursor rice material for this invention is preferably a parboiled rice. As set forth above, parboiled rice is usually defined as rice which has been steeped, heat treated and dried. During the heat treatment step of parboiling, the starch in the endosperm of the rice is substantially gelatinized. The parboiling process and the resulting gelatinization of the starch have several beneficial effects as described earlier. The rice may be prepared by soaking rough rice paddy (unmilled rice, substantially as it comes from the field,) in cold, warm or hot water for substantial period of time until the rice kernels have increased their moisture content, generally to at least above 25%; steaming the rice, generally at super-atmospheric pressure to substantially gelatinize at least 85% and up to 95–100% of the starch and the brown rice is wet milled. According to the present invention, the steps of rehydration and drying in the conventional fast cook/instant rice process can be either reduced or eliminated to prepare quick cooking or instant rice. Moreover, the dehusking may occur before or after parboiling. The parboiled rice may be partially dried and cooled before milling. Accordingly, the rice may be either directly cooled and milled after parboiling or milled after an intermediate drying and cooling steps.

EP-A-0 352 939 and U.S. Pat. No. 5,316,783 describe two suitable methods for parboiling brown rice.

One embodiment of the invention relates to a process comprising the steps of: hydration, steaming, milling and drying. After milling, the rice is either instantized or dried at low temperature until the moisture reaches 13%.

The process variables that affect the rice quality are essentially those factors that play a role in the reactions of rice starch chemistry, namely, moisture, heat, process time and minor components in rice. The moisture at which rice is milled and the expansion of rice in the instantization step are also key process variables. A summary of the process variables and the general effects on rice quality is shown in Table III.

TABLE III

Process variables and their functions

| Process variables | Process range | Function | Effect |
| --- | --- | --- | --- |
| Hydration | 31%–35% moisture | Equilibrium hydration | Rice starch plasticizer |

TABLE III-continued

Process variables and their functions

| Process variables | Process range | Function | Effect |
| --- | --- | --- | --- |
| Steaming conditions | 115–142° C. | Gelatinization | Disruption of starch structure |
| Milling at high moisture | 20–29% moisture | Mill off bran and disrupt cell wall & membrane structures | Polished smooth surface and faster cook/ soft texture |
| Instantize conditions | 185–210° C./30s 350–570 kg/m$^3$ | Expansion of rice kernel | Fastest cook, separate texture and elongate |

The hydration affects the parboiled rice quality in terms of the degree of gelatinization. Without equilibrium hydration, the center of the rice kernel is low in moisture. After parboiling, a low moisture rice center turns opaque (a white belly). This is due to the fact that at the high parboiling temperature, micro-fissuring is generated at the center of the grain (because of the lack of moisture). If rice is not hydrated fully, the gelatinization will not be completed unless a higher steam pressure/temperature is achieved. Gelatinization of starch is a process of melting the crystalline amylopectin chains with the assistance of water. The degree of gelatinization affects the cooking quality of rice, therefore, the extent of hydration indirectly influences the rice cooking quality.

Steaming (or parboiling), more than any other operation, contributes to the cooking quality of the rice. During steaming, the starch granules swell, dissolve in water and expel small fragments of amylose and absorb more moisture, if available. In general, the cooked rice texture firms up as the extent of gelatinization increases. Since the starch molecules inside the granules are heterogeneous, the process of gelatinization is a function of granule size, gelatinization temperature, starch molecular composition/ configuration, and starch:water concentration. The higher the temperature and the longer the time rice is steamed, the more gelatinization. At conventional parboiling pressures, long parboiling time in saturated steam causes more moisture absorption resulting in continuous hydration with spontaneous gelatinization.

Figure 12A:
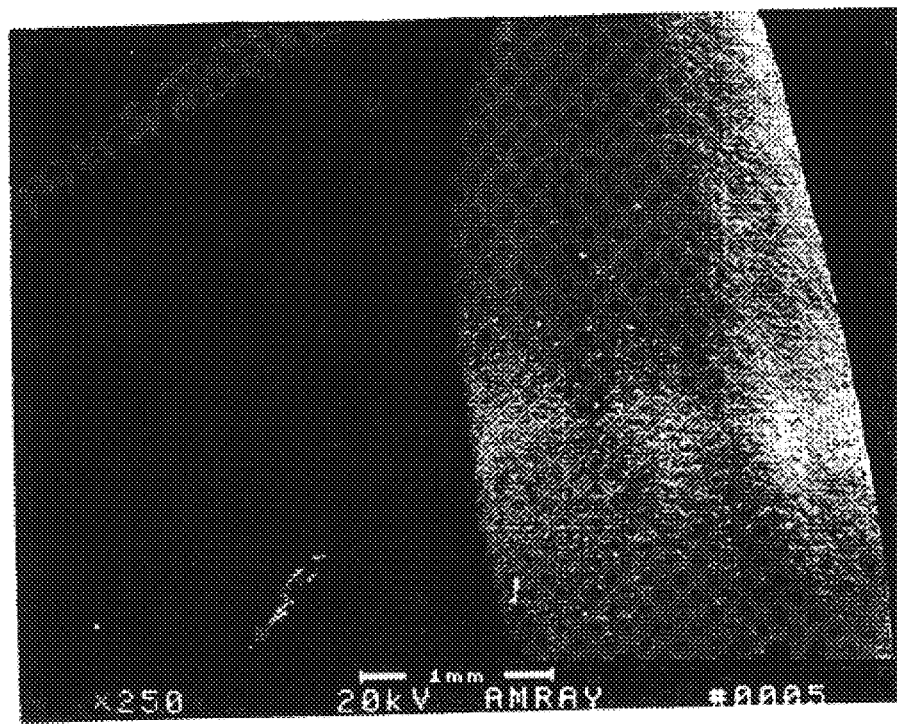
FIGS. 12(a) and (b) are secondary electron microphotographs of Thaibonnet rice milled at 14% moisture where
Figure 12B:
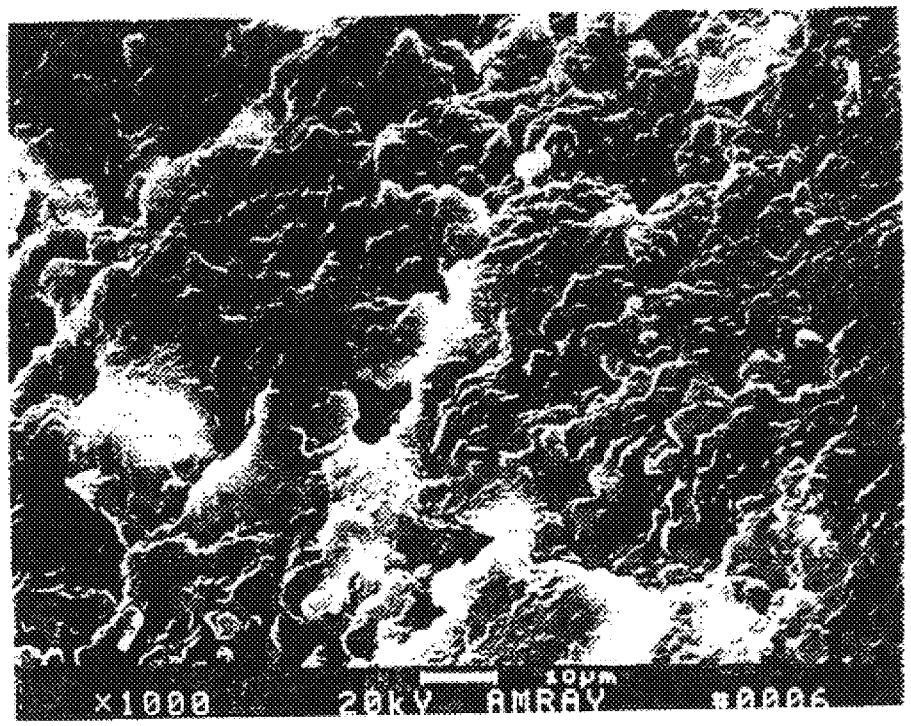
Figure 13A:
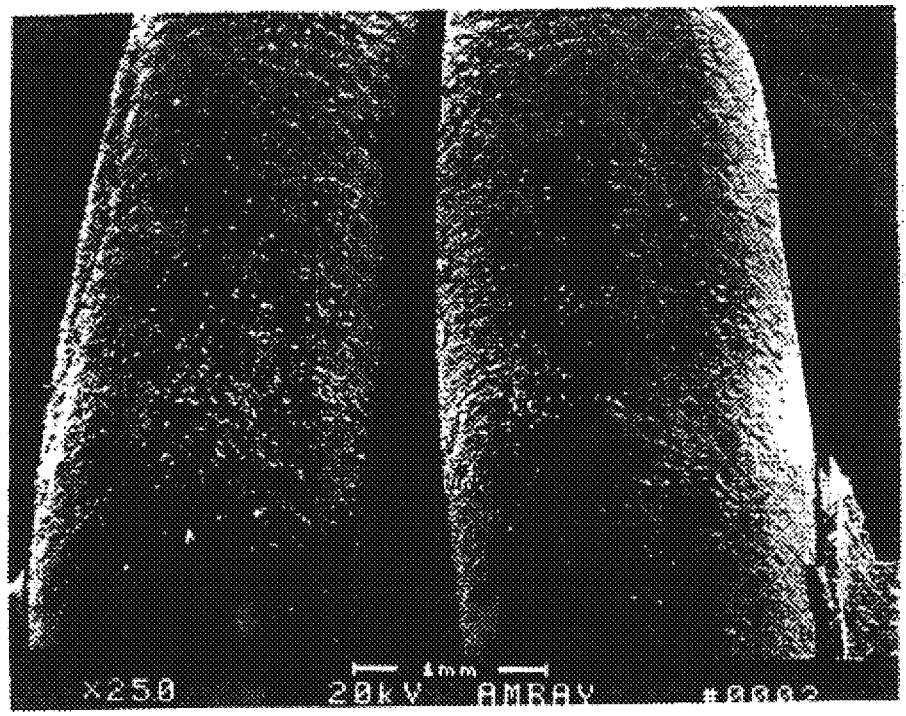
FIGS. 13(a) and (b) are secondary electron microphotographs of Thaibonnet rice milled at 24% moisture where
Figure 13B:
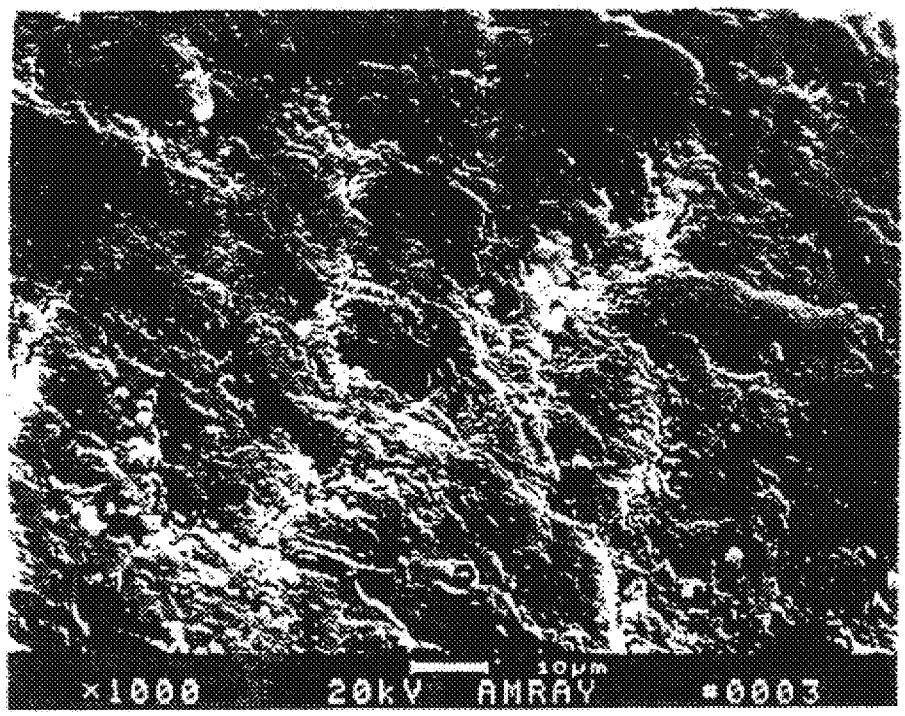

As discussed earlier, the milling of parboiled rice is normally performed at 13% moisture when the rice is hard and glassy. Parboiled rice at moisture contents of about 20% and higher has a viscoelastic texture. When milling is performed at this moisture level, rice flexes and bends inside the milling chamber apparently causing the disruption of the intercellular structure. The result is a rice with a very smooth polished surface, and a cook time shorter than conventionally parboiled rice. Because the milling is done on a soft surface, bran layers up to the sub-aleurone layer are "rubbed" or "peeled" off layer after layer by the abrasive milling stone. This leaves the amyloplast cells intact. This is confirmed in FIGS. 12 and 13 which are secondary electron microphotographs of Thaibonnet rice milled at 14% moisture (FIG. 12) and 24% moisture (FIG. 13). FIG. 12(b) illustrates the rough torn up surface of the 14% moisture rice, compared with FIG. 13(b) which confirms that the 24% moisture rice has a smoother surface. During cooking, the cooked rice surface is still smooth even after starch granules had taken up three times the amount of water at the end of cooking.

It is believed that the intercellular structures of the parenchyma cells in the endosperm may be damaged during the milling at high moisture. This disruption enables the faster moisture diffusion into the rice, and thus fast cooking and higher water absorption rates. This physical change is a function of the flexibility of the rice grain. At higher moisture contents, rice is more soft and more flexible than at lower moisture contents. Therefore, the effect of bending, bumping and flexing impacts the inward cell structure and the extent of intercellular structural damage is more severe. Rice milled at higher moisture is cooked faster and has a softer texture than the rice milled at lower moisture.

Another preferred embodiment of the present invention relates to a process for preparing a quick-cooking rice, comprising the steps of:

(a) treating brown rice with water at a temperature up to its boiling point to increase its water content to 17 to 30%;

(b) steaming the treated rice at a temperature from 100 to 125° C. to increase its water content to 19 to 32%;

(c) heating the steamed rice, in a sealed vessel, under pressure and using dry heat, to a minimum temperature of approximately t° C. wherein $t=195-2.5M$ and M is the moisture content of the steamed rice in percent, for from 1 to 5 minutes;

(d) reducing the pressure on the rice over a period of 1 to 10 minutes to atmospheric pressure, thereby allowing water to evaporate from the heated rice to reduce its temperature to approximately 50° C. and its water content to 17 to 27%;

(e) milling the parboiled rice at a moisture content of from more than 17% to 32%; followed by (f) drying the milled rice to microbiological stability (c. 14%).

Preferably, the wet milling step (e) is carried out on rice having a moisture content in the range 19%–27%. Milling rice grains having very high moisture contents such as above 32% moisture content, results in a product having a texture somewhat different from that of ordinary rice, and more closely resembling the texture of pasta. For these reasons, milling is preferably carried out at moisture contents of 19% to 27%. At these moisture contents, the rice grains are resilient so that breakage losses during milling are also reduced.

Preferably, the dry heating step (c) is carried out by applying microwave or radio frequency energy to the steamed rice in a sealed vessel under pressure. Preferably, the rice is held at 133–137° C. for a further 1 to 5 minutes in step (c).

Preferably step (d) is carried out for 1–4 minutes to reach a moisture content of 22–27%.

Preferably the wet milling step (e) of the process to the present invention is carried out on the rice or slightly above ambient temperature, typically 20–50° C.

Generally, the selection of a higher moisture content for the milling step (e) results in a faster cooking dried milled product. Depending on the rice variety and the moisture level at milling, cooking times as low as five minutes for the product can be achieved, the cooked rice having natural appearance and texture.

The drying step (f) is normally carried out at atmospheric pressure with a hot air, as is conventional for parboiling processes. However, in certain preferred embodiments, the drying step (f) is carried out at high speed to achieve an "instant" rice product. That is to say, a rice product that can be cooked to an acceptable texture in boiling water in less than five minutes, more preferably in two minutes or less (see definitions above). The high-speed drying may be carried under reduced pressure, or with high speed heating to give a puffing of the product. The instant rice product normally does not have a natural rice appearance.

Another aspect of the invention relates to the benefit achieved from milling the rice at high moisture is that the rice can be instantized right after milling without an additional cooking or hydrating step. Therefore, one embodiment of the present invention relates to instantizing the wet milled rice product subsequent to the wet milling. The "instantizing" may include micronization, puffing, etc. The volume expansion of the high moisture milled rice correlates positively with the degree of gelatinization, moisture-content and instantizing temperature. The higher the expansion, the more porous rice structure and therefore, faster cooking. However, the instantized rice "remembers" the texture from the steaming conditions and the effect from the high moisture milling before the instantization. Instantizing before retrogradation (caused by tempering and/or drying) would keep the rice in the soft and fully gelatinized condition. The energy required for instantizing to achieve the desirable volume expansion is lower since the rice is still unretrograded. Lower instanization energy means lower instantization temperatures, and thus less undesirable discoloration and higher instant rice quality. If rice was milled at a higher moisture, as mentioned earlier, the rice has a softer texture and is cooked faster. After instantization, the rice has a significant additional reduction in cook time because of the faster water diffusion rate into the porous structure.

The instant rice of the invention has improved separateness and increased cooked volume yield. The quality of instant cooked rice is also superior compared to the quality of presently available current instant rice products in terms of appearance.

One embodiment for making an instant rice is as follows:

(a) treating brown rice with water at a temperature up to its boiling point to increase its water content to 17 to 30%;

(b) steaming the treated rice at a temperature from 100 to 125° C. to increase its water content to 19 to 32%;

(c) heating the steamed rice, in a sealed vessel, under pressure and using dry heat, to a minimum temperature of approximately t° C., wherein $t=195-2.5M$ and M is the moisture content of the steamed rice in percent, for from 1 to 5 minutes;

(d) reducing the pressure on the rice over a period of 1 to 10 minutes to atmospheric pressure, thereby allowing water to evaporate from the heated rice to reduce its temperature to approximately 100° C. and its water content to 17 to 27%;

(e) milling the parboiled rice at a moisture content of from more than 17% to 32% followed by (f) drying the milled rice to microbiological stability (c. 14%) at 120° C.–200° C. for 1–5 minutes.

The present invention also provides an instant rice obtainable by a process according to the present invention. Preferably, the instant rice has a cooking time in boiling water at 100° C. of two minutes or less (see definitions above). According to another embodiment, the instant rice is a "ready-to-eat" crisp product.

EXAMPLES

The following examples are illustrative of some of the products and methods of making the same falling within the scope of the present invention. They are, of course, not to be considered in any way limitative of the invention. Numerous changes and modifications can be made with respect to the invention including the selection of the type of rice, parboiling method, moisture level during milling or manipulation, time of milling or manipulation, volume of rice and rate through mill, type of milling machine used, milling or manipulation temperature, ranges of proportions, time and temperature during operation and the like.

Example 1

U.S. Variety (Gulfmont) raw brown rice was atmospherically hydrated at a temperature 5° C. below the gel temperature ($T_g$) for about 2–3 hours. The moisture of the rice reached an equilibrium moisture content of 33% w.b. The rice was thoroughly dewatered. The rice was then steam parboiled at 15–20 psig (121–125° C.) for 2–6 min. The rice had about 32% moisture after steaming.

After parboiling, brown rice lost its birefringence under the polarized light. The rice was then dried by forced air to a range from 20% to 28% moisture. The partially dried rice was milled by passing rice through an abrasive horizontal mill three times (In the conventional milling practice, the rice is dried down to 13–14% moisture before milling.) After milling, the rice is dried to 13–14% moisture.

The Following Methods and Standards were Used for Testing or Evaluating Rice

Bulk Density (kg/m³)

Dry rice: Gradually pour 200 g of rice into a 1000 mL graduated cylinder. Level the top without shaking the cylinder. Read volume from the top of the rice level. Tap the cylinder in a vertical motion at the bottom three or four times to pack down the rice and read the volume for the maximum bulk density. The minimum bulk density is derived from shaking the cylinder in the vertical motion a few times, level rice and read the volume for bulk density calculation.

$$\text{Bulk density} = \frac{200 \text{ (g)}}{\text{rice volume (mL)}} \times 1000 \text{ kg/m}^3$$

Cooked rice: Fill cooked rice in a ⅓ cup measuring cup (79 mL) without packing. Weigh the rice and subtract the weight of the measuring cup.

$$\text{Bulk density} = \frac{\text{Total wt.} - \text{cup wt.}}{\text{Cup volume (mL)}} \times 1000 \text{ kg/m}^3$$

Rice Dimensions (mm)

Measure 50 kernels of rice by a caliper along the major three axes—the length, width and the girth (the smallest dimension). The dimensions are expressed as averages and standard deviation of the 50 kernels.

Cooking Evaluation

Water Absorption Ratio

Bring 750 mL of city water (tap) to a boil on a gas stove in a ½ qt. pot, pour 100 g of dry rice (at about 12% w.b.) into the boiling water, cover and reduce heat to simmer (medium heat), start timing. After a pre-set cooked time, turn off the flame, pour rice and water onto a strainer. Drain water for 2 minutes. Weigh cooked rice.

$$\text{Water absorption ratio} = \frac{\text{Cooked rice wt. (g)}}{\text{Dry rice wt. (100 g)}}$$

Testing Shear Press Value (Firmness)

Ten minutes after rice is cooked, use 50 g of cooked rice for shear press test. Place 50 g of the cooked rice sample evenly inside the Kramer shear press cell, apply compression at the rate of 10 cm/min on the Food Technology Corp. TG4C model with a FTA-300 load cell strain gauge. The maximum shear press value in the single compression test is used as an indication of firmness of the rice.

Figure 14:
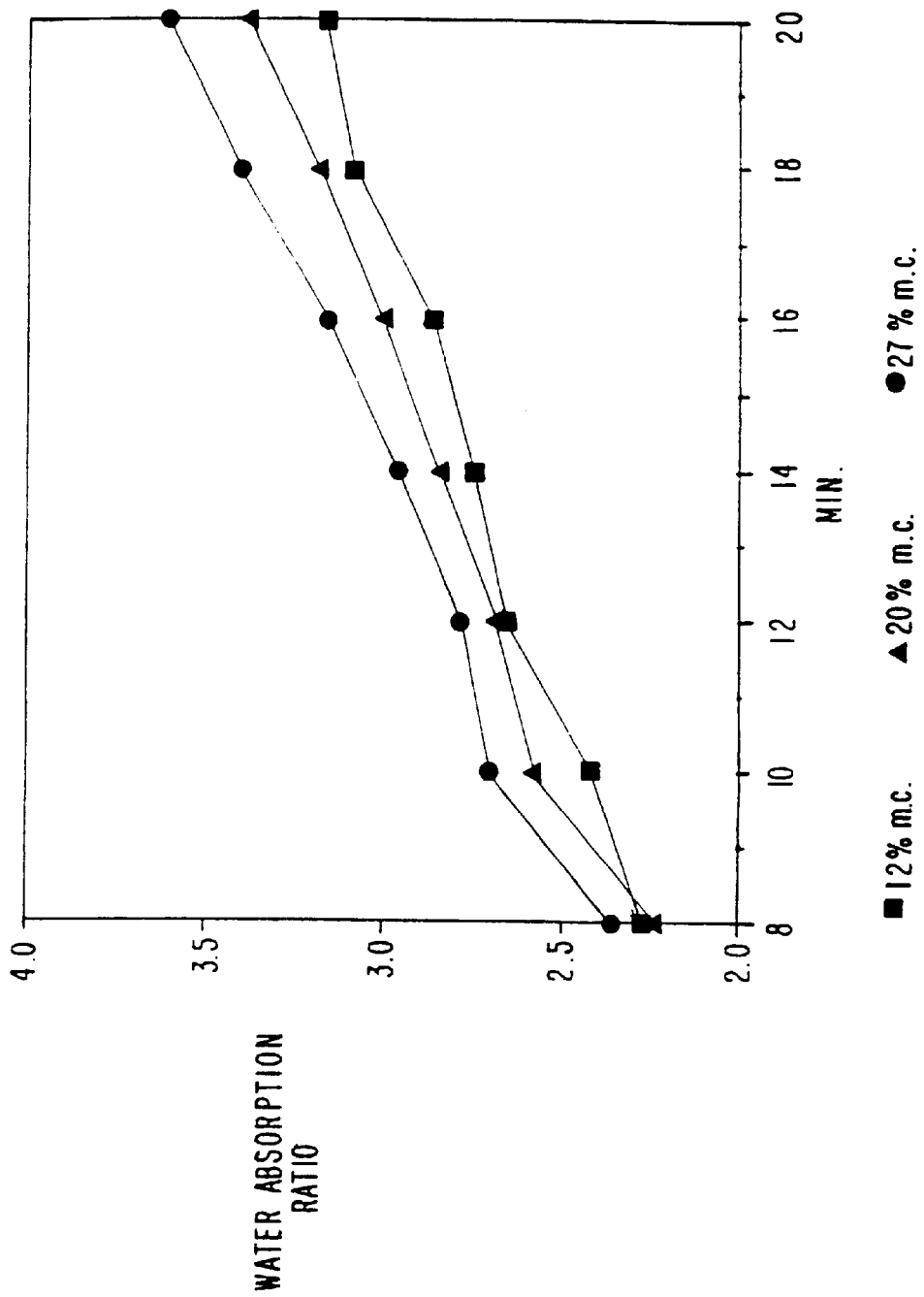
FIG. 14 is a graphical representation of the relationship between water absorption ratio (vertical axis) and cook time (horizontal axis) for Gulfmont rice milled at 12%, 20% or 27% moisture.
Figure 15:
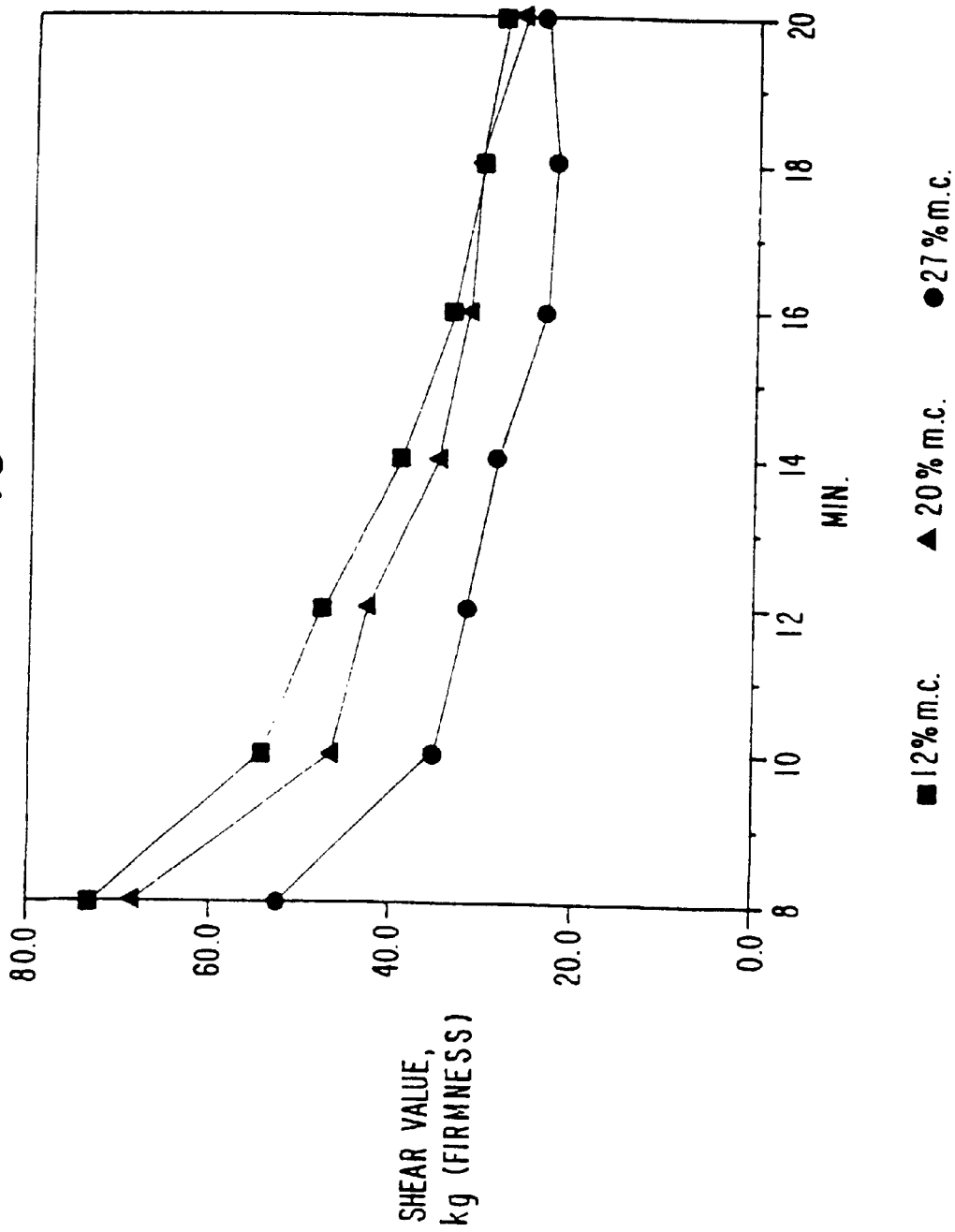
FIG. 15 is a graphical representation of the relationship between shear value (vertical axis) and cook time (horizontal axis) for Gulfmont rice milled at 12%, 20% or 27% moisture.

The following is typical sensory texture descriptions of cooked rice which illustrate the applicability of the values set forth in Tables IV through VI and FIGS. 14 and 15.

Firmness

| Correlated with shear press value: | |
| --- | --- |
| Hard | above 50 kg |
| Firm | about 40–45 kg |
| Soft | below 30 kg |

Cohesiveness

| Correlated with water absorption ratio. | |
| --- | --- |
| Brittle | below 2.5 |
| Tender | about 2.7–2.8 |
| Mushy | above 3.4 |

Fracturability

Useful for describing the white rice cooking texture, undercooked will have hard crumbly center, overcooked would be cohesive.

Gumminess

Correlate to shear press value and moisture of rice. Can be useful to describe the cooked rice when holding for a long period of time (such as on the steam table for food service rice.)

| Gummy | shear press above 50 kg<br>moisture below 67% w.b. |
| --- | --- |
| Mealy | shear press below 20 kg<br>moisture above 75% w.b. |

Starchiness

Also for describing the white rice cooking texture, since it is related to the integrity of the grain on the surface.

Tooth Pack

| Correlate to the water absorption ratio: | |
| --- | --- |
| Adhesive and gummy | below 2.5 |
| Loose and biteful | above 2.7 |

The characteristics of the resultant products are set forth in the following Tables IV–VI.

Water uptake and shear press value of Gulfmont rice processed and milled at different moistures Dry rice characteristics:

TABLE IV

Before Process (treatment)

| | | |
|---|---|---|
| Rice Variety | Gulfmont-milled white rice | |
| Process | No processing | |
| Mill moisture | 12% moisture | |
| Bulk density | min 785 kg/m³ | max 870 kg/m³ |
| Kernel length | 6.9 mm | 0.3 mm stdv. |
| Kernel width | 2.2 mm | 0.1 mm stdv. |
| Kernel girth | 1.7 mm | 0.1 mm stdv. |

TABLE V

After various processes (treatments)

| | Test sample 1 — 12% moisture milling | | | Test sample 2 — 20% moisture milling | | | Test sample 3 — 27% moisture milling | | |
|---|---|---|---|---|---|---|---|---|---|
| Variety | Gulfmont-milled parboiled rice | | | Variety: Gulfmont-milled parboiled rice | | | Variety: Gulfmont-milled parboiled rice | | |
| Process | 123° C. 5 min | | | Process: 123° C. 5 min | | | Process: 123° C. 5 min | | |
| Mill moisture | milled at 12% moisture | | | Mill moisture: milled at 20% moisture | | | Mill moisture: milled at 27% moisture | | |
| Bulk density kg/m³ | min 800 | max 885 | | Bulk density: min 800 | max 833 | | Bulk density: min 784 | max 833 | |
| Kernel length | 7.2 mm | 0.3 mm stdv | | Kernel length: 7.0 mm | 0.3 mm stdv | | Kernel length: 6.5 mm | 0.5 mm stdv | |
| Kernel width | 2.2 mm | 0.2 mm stdv | | Kernel width: 2.2 mm | 0.2 mm stdv | | Kernel width: 2.1 mm | 0.1 mm stdv | |
| Kernel girth | 1.5 mm | 0.1 mm stdv | | Kernel girth: 1.6 mm | 0.3 mm stdv | | Kernel girth: 1.6 mm | 0.1 mm stdv | |

TABLE VI

Cooked rice characteristics
Parboiled Gulfmont Rice Milled at Different Moistures (Ref. Table V)

| | Test sample 1 — 12% moisture milling | | | Test sample 2 — 20% moisture milling | | | Test sample 3 — 27% moisture milling | | |
|---|---|---|---|---|---|---|---|---|---|
| Cook time min | water absorption ratio | shear value, kg 50 g shear | bulk density kg/m³ | water absorption ratio | shear value, kg 50 g sample | bulk density kg/m³ | water absorption ratio | shear value, kg 50 g sample | bulk density kg/m³ |
| 8 | 2.27 | 73.0 | 570 | 2.24 | 68.4 | 602 | 2.36 | 52.5 | 554 |
| 10 | 2.42 | 54.3 | 641 | 2.58 | 46.7 | 697 | 2.70 | 35.3 | 687 |
| 12 | 2.65 | 47.6 | 637 | 2.68 | 42.6 | 692 | 2.78 | 31.7 | 654 |
| 14 | 2.74 | 39.1 | 625 | 2.84 | 34.9 | 671 | 2.96 | 28.4 | 667 |
| 16 | 2.85 | 33.3 | 645 | 3.00 | 31.7 | 647 | 3.16 | 23.3 | 660 |
| 18 | 3.08 | 30.2 | 613 | 3.18 | 30.7 | 612 | 3.40 | 22.3 | 676 |
| 20 | 3.16 | 28.0 | 615 | 3.38 | 26.1 | 697 | 3.60 | 23.7 | 694 |

As set forth in Table V, Gulfmont variety rice was milled at 12%, 20% and 27% moisture. As can be seen by comparing the dimensions (length, width and girth) of the kernels before milling with no parboiling (Table IV) and after parboiling with dry milling and parboiling with wet milling (Table V), the parboiling and milling do not significantly alter the size and shape of the rice.

Table VI sets forth various cooked rice characteristics such as water absorption ratio, shear value and bulk density. The water absorption ratio and shear values for the 12%, 20% and 27% moisture milled rice are shown in FIGS. 14 and 15.

FIG. 14 shows that the water absorption ratio for 12% milled rice is less than the 20% and 27% at from 10 to 20 minute cook times. Although the water absorption for the 12% and 20% moisture rice may look comparable at 8 minutes, the level of "cook" is believed to be different. This is confirmed by referring to FIG. 15 which illustrates the shear value of the rice at different cook times. As shown in this figure, the shear value (firmness) of the 20% and 27% rice are always significantly less than the 12% rice. Accordingly, although the water absorption of the 12% rice is comparable to the 20% rice at 8 minutes, the 12% rice shear value of 73 kg compared to 68.4 kg for the 20% rice indicates the 20% rice is faster cooking than the 12%.

Moreover, at ten minutes the shear value for the 12% rice is 54.3 kg compared to 46.7 Kg for the 20% rice. The cooked rice should have a shear value below 50 Kg to be palatable (i.e., appropriate firmness). Accordingly, the 20% rice is faster cooking than the 12% rice.

Example 2

(a) Preparation of Quick-Cooking Rice

Two 500 kilogram samples of rice varieties (Cypress and Thaibonnet) from which the husks, but not the bran, have been removed was fed into a hot steeper bath containing water at 71° C. The residence time of the rice in the water was 4.5 minutes. During transit through the steeper, the moisture of the rice was raised to 25%.

The rice was then transported to a dewatering belt to remove surface water from the rice. The residence time of the rice on the belt was between 30–60 seconds. The rice was fed from the belt directly into a steamer, in which steam at 106° C. and about 0.20 bar overpressure was applied to the rice. The residence time of the rice in the steamer was 30 minutes. During its transit through the steamer, the moisture of the rice was raised to about 28% and its temperature was raised to 106° C.

The steamed rice was then fed into a continuous microwave unit operating at 133 to 136° C. and an overpressure of about 3.5 bar. The residence time of the rice in the microwave unit was 4 minutes. During its residence time in the microwave unit, the starch in the rice grains was fully gelatinized.

The rice was then passed to a pressure reduction system, wherein the pressure on the rice was released in 2–3 steps over a period of 1 to 6 minutes. During this time, the temperature of the rice drops to about 100° C., its moisture was reduced to about 25% and the pressure fell to atmospheric pressure.

In a first embodiment, the rice at approximately 25% moisture was cooled to about 35° C. and then milled as described below.

To provide a comparative example, a portion of the rice was further dried in the conventional grain dryer to 14% moisture, and then cooled to about 35° C. and milled as described further below.

Provided that the drying of the rice was carried out in a conventional grain dryer, the resulting dried milled rice has a smooth and glossy appearance characteristic of milled parboiled rice. Similar appearances are achieved for the samples milled at 14% and 24% moisture.

(b) Preparation of Instant Rice

A brown rice is parboiled and milled as described above with moisture contents of 19% and 24% moisture. The milled, wet rice is then instantized by hot air drying for 10 seconds–7 minutes at 120–270° C. A typical example is a treatment of wet milled rice at 24% moisture at 174° C. for 2.5 minutes. The drying conditions will result in a reduced bulk density, preferably the products have a bulk density in the range of 300 to 600 Kg/m$^3$. The result is a product with a cooking time of 5 minutes or less, depending upon the expansion degree obtained.

(c) Evaluation of Cooking Texture

Figure 16:
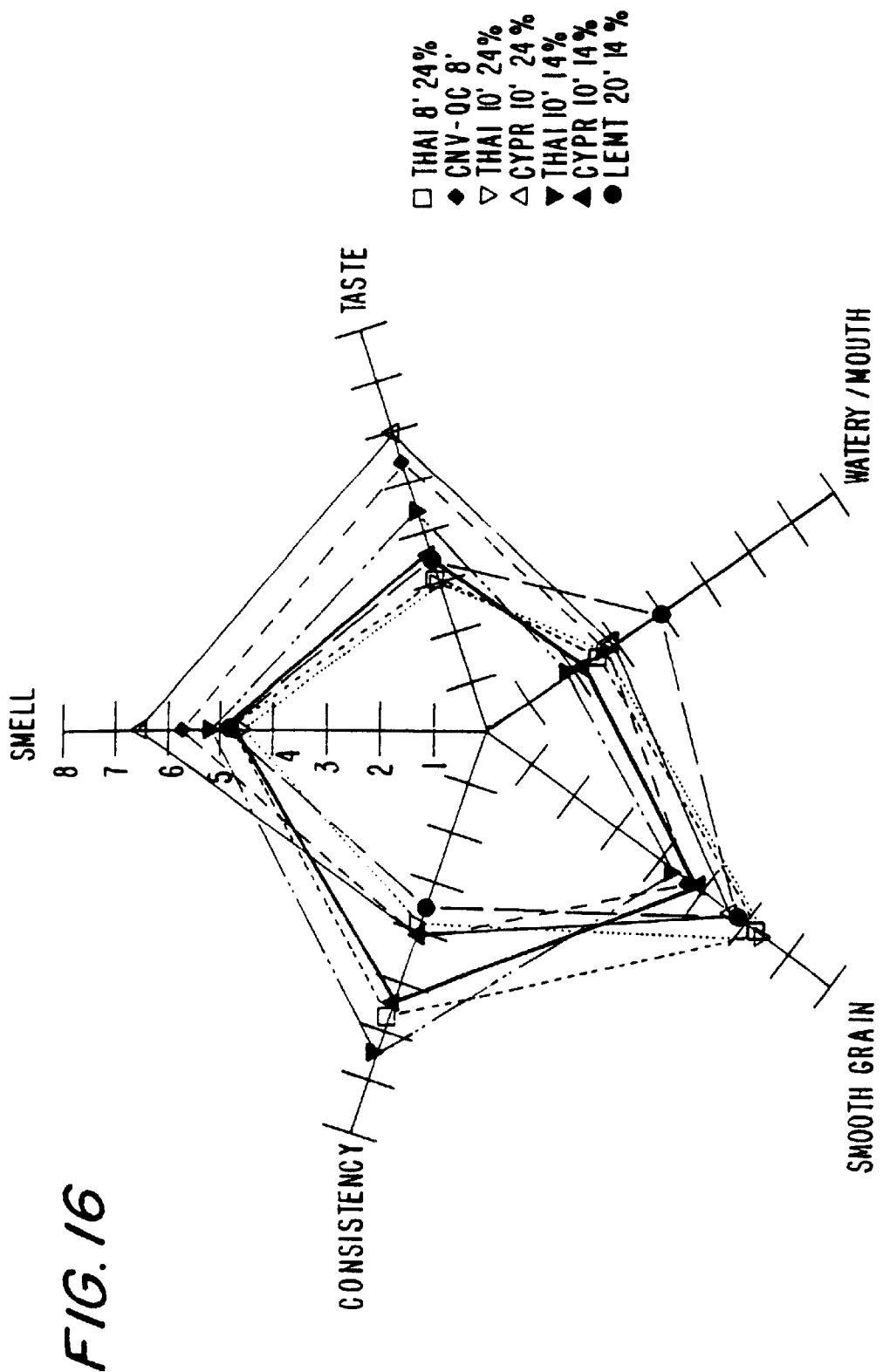
FIG. 16 illustrates data from a sensory evaluation for 14% moisture and 24% moisture wet milled rice kernels.

After cooking the wet milled rice obtained in paragraph (a) above for 10 minutes, the texture of the rice was evaluated. A softer, more desirable 10 minute texture level was achieved in the rice milled at 24% moisture contents compared to conventional 20 minute-cook rice. Results are shown in FIG. 16.

Sensory Analysis of Rice Products Made According to the Invention

The quality of 24% moisture wet milled Thaibonnet rice —cooked 8 and 10 minutes—versus the conventional parboil (Lemont 14% moisture milled) 20 minutes and conventional fast cook (14% moisture milled) 10 minutes rice was evaluated.

Compared to the 14% moisture milled fast cook 10 minutes rice, the wet milled rice has a more sticky, a slightly whiter appearance with less splits and a better milling.

With respect to the 10 min cook wet milled rice is as soft as the 20 minutes cook conventional parboiled rice and the 8 minutes cook wet milled rice is softer than the 10 minutes 14% milled fast cook rice.

For taste and smell, panelists remarked the 14% milled fast cook 10 minutes rice had a less favorable flavor and off taste.

1. Products Tested
   1) 24% milled wet mill Thaibonnet (wm) 10 min cook
   2) 24% milled wet mill Thaibonnet (wm) 8 min cook
   3) 14% milled Thaibonnet 10 min cook
   4) 14% milled Lemont 20 min cook 2. Method A group of 10 panelists trained on given descriptors are presented the test samples in a random order over a series of 2 trials. Each sample is tried at least twice. The scores for each product and each descriptor are collected and statistically analyzed.

3. Results (See Also FIG. 16)

Significant differences (based on 95% level) are detected for following parameters.

| PARAMETER | DIFFERENCE | LEVEL OF SIGNIFICANCE |
|---|---|---|
| Smell | 10' wm better than Thaibonnet 10' (14%) fast cook | * |
| Taste | 8 & 10' wm better than Thaibonnet 10' (14%) fast cook | * |
| Water/mouth | Lemont 14% mill 20 min cook more than Thaibonnet 10' (14%) fast cook | ** |
| Smooth grain | 8' wm & 10' wm more than Thaibonnet 10' (14%) fast cook | * |
| Consistency | 8' wm & 10' Thaibonnet (14%) fast cook firmer than 10' wm | * |
|  | 8' wm firmer than Lemont 14% milled 20' cook | ** |
|  | Thaibonnet 10' (14%) fast cook firmer than 10' wm & Lemont 14% milled 20' cook | *** |
| Stickiness | Thaibonnet 10' (14%) fast cook less sticky than 8' & 10' wm & Lemont 14% milled 20' cook | *** |
| color | 8' wm & Thaibonnet 10' (14%) fast cook darker than Lemont 14% milled 20' cook | *** |
|  | 10' wm darker than Lemont 14% milled 20' cook | * |
|  | Thaibonnet 10' (14%) darker than 10' wm | ** |
| milling | Lemont 14% milled 20' cook better than Thaibonnet 10' (14%) fast cook | * |
|  | 8' & 10' wm better than Thaibonnet 10' (14%) fast cook & Lemont 14% milled 20' cook | *** |
| Splits | 8' & 10' wm better than Thaibonnet 10' (14%) fast cook & Lemont 14% milled 20' cook | *** |
| Grainlength | 10' wm longer than Lemont 14% milled 20' cook | *** |
|  | 8' wm & Thaibonnet 10' (14%) fast cook longer than Lemont 14% milled 20' cook | ** |
| Grainthickness | Thaibonnet 10' (14%) fast cook & 8' & 10' wm thinner than Lemont 14% milled 20' cook | ** |

Sensoroy Analysis of Cypress Rice Products

The quality of wet milled Cypress rice—14% moisture and 24% moisture—versus the Thaibonnet 10 minutes 14% milled fast cook and 8 minutes conventional quick cook rice (Cnv-Qc) with low bulk density was evaluated.

Appearance

Overall the 24% moisture wet mill rice gets the best scores for splits, milling and color. Compared to the Cnv-Qc rice, the two wet mill rice products have a less sticky, whiter appearance with less splits, a better milling and longer but thinner kernels.

Compared to the Thaibonnet 10 minutes 14% milled fast cook rice, both of the wet mill products have a better milling and less splits.

Texture

Cypress 14% moisture milled and the Thaibonnet 10 minutes 14% milled fast cook rice are firmer than the 24% Cypress and Cnv-Qc. Both groups get highly similar scores.

For Smell and Taste

Cypress 24% and Cnv-Qc get worse scores compared to the 14% milled product and the Thaibonnet 10 minutes 14% milled fast cook rice.

Products Tested 1) 24% milled wet milled Cypress (wm) 10 min cook
2) Cnv-Qc—8 min cook
3) Thaibonnet 10 min 14% milled fast cook 10 min cook
4) 14% milled Cypress 10 min cook Method A group of 10 panelists trained on given descriptors are presented the test samples in a random order over a series of 2 trials. Each sample is tried at least twice. The scores for each product and each descriptor are collected and statistically analyzed.

Results (See Also FIG. 16)

Significant differences (based on 95% level) are detected for following parameters.

| PARAMETER | DIFFERENCE | LEVEL OF SIGNIFICANCE |
|---|---|---|
| Smell | 10' wm 24% worse than Thaibonnet 10' (14% milled) fast cook | ** |
|  | 10' wm 24% worse than 14% Cypress 10' | * |
| Taste | 14% Cypress worse than Cnv-Qc | * |
|  | 14% Cypress worse than 24% wm | ** |
|  | 24% wm worse than Thaibonnet 10' (14%) fast cook | * |
| Consistency | 24% wm & Cnv-Qc rice softer than Thaibonnet 10' (14%) fast cook & 14% (Cypress) | * |
| Stickiness | Cnv-Qc more than all rice | *** |
|  | Thaibonnet 10' (14%) fast cook more than 14% (Cypress) | * |
| Color | 24% wm whiter than Cnv-Qc rice | *** |
|  | 24% wm whiter than Thaibonnet 10' (14%) & 14% (Cypress) | ** |
|  | 14% Cypress whiter than Cnv-Qc | ** |
| Milling | 24% wm better than Cnv-Qc, Thaibonnet 10' (14%) fast cook | *** |
|  | 24% wm better than 14% (Cypress) | ** |
|  | 14% Cypress better than Cnv-Qc rice | ** |
|  | 14% Cypress better than Thaibonnet 10' (14%) fast cook; | * |

-continued

| PARAMETER | DIFFERENCE | LEVEL OF SIGNIFICANCE |
|---|---|---|
| Splits | 24% wm better than Cnv-Qc rice, Thaibonnet 10' (14%) fast cook & 14% Cypress | *** |
|  | 14% Cypress better than Cnv-Qc rice | ** |
|  | 14% Cypress better than Thaibonnet 10' (14%) fast cook | * |
| Grainlength | 24% wm & 14% (Cypress) longer than Cnv-Qc rice | */ |
|  | Thaibonnet 10' (14%) fast cook longer than Cnv-Qc rice | *** |
| Grainthickness | 24% wm & 14% (Cypress) thinner than Cnv-Qc rice | *** |
|  | Thaibonnet 10' (14%) fast cook thinner than Cnv-Qc rice | * |

(d) Effect of Wet Milling on Cooking Yield

The effect of wet milling on the cooking yield of the dried parboiled rice product obtained by the process of the present invention is shown in Table I above. It can be seen that the wet milling step results in an improved cooking yield relative to dry milled fast cooking rice.

The above-described aspects of the present invention may all be present in an embodiment of the invention or present in any combination thereof. The above description of the invention is intended to be illustrative and not limiting. Various changes or modifications in the embodiments described may occur to those skilled in the art. These can be made without departing from the spirit or scope of the invention.

What is claimed is:

1. A method of preparing a quick-cooking rice, consisting essentially of the steps:

providing rice grains having substantially all of its bran and germ layers intact;

parboiling the rice grains to substantially gelatinize the starch in the rice grains;

followed by partially drying the rice grains to a moisture content of about 17 to 35% by weight;

followed by a milling process of milling the rice grains at a rice grain moisture content of about 17 to 35% by weight to remove substantially all of the bran and germ from the rice grains, whereby during the milling process the rice grains are mechanically manipulated in order to flex the rice grains, the flexing causing disruption of the individual rice grain's intracellular structure, resulting in a plurality of uniform weblike microfissures on at least a portion of the surface of each grain; and then drying the parboiled rice grains to produce a quick-cooking rice that has a water absorption level greater that 230 grams of cooked rice per 100 grams of dry rice after cooking in excess water for about eight minutes, wherein the individual rice grains are about the same in shape both before and after cooking as conventionally prepared parboiled rice grains appear both before and after cooking.

2. The method of claim 1, wherein the rice grains have a moisture content of about 19 to 28% by weight during milling.

3. The method of claim 2, wherein the rice grains have a moisture content of about 23% to 26% by weight during milling.

4. The method of claim 1 wherein the plurality of microfissures interconnect to form a web-like pattern comprising a multitude of transverse and longitudinal microfissures.

5. The method of claim 1, wherein the microfissures have a depth of greater that 0.01 mm.

6. The method of claim 1, wherein the individual rice grains have surfaces that are substantially free from microscopic pitting and gouging caused by dry milling of rice grains having a moisture content less than 17% by weight.

7. The method of claim 1, wherein the rice grains have a water absorption level of greater than about 245 grams of cooked rice per 100 grams of dry rice after cooking in excess water for eight minutes.

8. The method of claim 1, wherein the rice grains have a water absorption level of greater than about 265 grams of cooked rice per 100 grams of dry rice after cooking in excess water for about ten minutes.

9. The method of claim 1, wherein the individual rice grains are substantially undistorted, being similar in shape and size as conventional parboiled rice when viewed by the naked eye, both before and after cooking.

10. The method of claim 1, wherein the mechanical manipulation of the rice grains is performed such that the mechanical forces are applied in a uniform universal array of directions.

11. The method of claim 10, wherein the mechanical manipulation is performed by a physical force selected from the group consisting of flexing of the grains, impacting of the grains, and applying sonic energy to the rice grains.

12. The method of claim 1, wherein the parboiled rice grains can be prepared from paddy rice or brown rice.

13. The method of claim 1, wherein the method of conventionally preparing the parboiled rice includes the steps of soaking rough or paddy rice in 50–70° C. water for 2–4 hours, resulting in a rough rice having a moisture content of 30–35 wt %; draining the water from the soaked rice; applying steam heat under pressure for 8–20 minutes to cause gelatinization; drying the steamed. rice to a moisture content of 12–14 wt % moisture; and milling the rice to remove the bran.

14. A method of preparing an instant-cooking rice, consisting essentially of the steps of:

provifing rice grains having substantially all of its bran and germ layers intact;

parboiling the rice grains to substantially gelatinize the starch in the rice grains;

followed by partially drying the rice grains to a moisture content of about 17 to 35% by weight;

followed by a milling process of milling the rice grains at a rice grain moisture content of about 17 to 35% by weight to remove substantially all of the bran and germ from the rice grains, whereby during the milling process the rice grains are mechanically manipulated in order to flex the rice grains, the flexing causing disruption of the individual rice grain's intracellular structure, resulting in a plurality of uniform weblike microfissures on at least a portion of the surface of each grain;

followed by subjecting the mechanically manipulated rice grains to a process selected from the group consisting of micronization, puffing and hot air drying in order to expand the individual rice grain's volume; and then drying the rice grains to produce an instant-cooking rice that has a water absorption level greater that 230 grams of cooked rice per 100 grams of dry rice after cooking in excess water for about five minutes.

15. The method of claim 14, wherein the parboiled rice grains can be prepared from paddy rice or brown rice.

\* \* \* \* \*